(12) United States Patent
Lysaght et al.

(10) Patent No.: US 10,613,875 B1
(45) Date of Patent: Apr. 7, 2020

(54) RUNTIME GENERATORS FOR REGULAR EXPRESSION MATCHING AND RANDOM NUMBER GENERATION

(71) Applicant: Xilinx, Inc., San Jose, CA (US)

(72) Inventors: Patrick Lysaght, Los Gatos, CA (US); Graham F. Schelle, Longmont, CO (US); Parimal Patel, San Antonio, TX (US); Yun Qu, Campbell, CA (US)

(73) Assignee: XILINX, INC., San Jose, CA (US)

( * ) Notice: Subject to any disclaimer, the term of this patent is extended or adjusted under 35 U.S.C. 154(b) by 85 days.

(21) Appl. No.: 15/949,408

(22) Filed: Apr. 10, 2018

(51) Int. Cl.
*G06F 9/44* (2018.01)
*G06F 7/58* (2006.01)
*G05B 19/04* (2006.01)
*G06F 9/445* (2018.01)
*G05B 19/045* (2006.01)

(52) U.S. Cl.
CPC ........... *G06F 9/445* (2013.01); *G05B 19/045* (2013.01); *G06F 7/582* (2013.01)

(58) Field of Classification Search
CPC ........ G06F 9/445; G06F 7/582; G05B 19/045
See application file for complete search history.

(56) References Cited

U.S. PATENT DOCUMENTS

| | | | | |
|---|---|---|---|---|
| 7,523,434 B1* | 4/2009 | Taylor | ................. | G06F 17/5054 716/100 |
| 7,640,526 B1* | 12/2009 | Blodget | .............. | G06F 17/5054 703/22 |
| 8,402,409 B1* | 3/2013 | Janneck | .............. | G06F 17/5054 716/103 |
| 2011/0025376 A1* | 2/2011 | Grittke | ................... | G01D 3/022 326/40 |

OTHER PUBLICATIONS

Eslami, F. et al., "Enabling Effective FPGA Debug using Overlays: Opportunities and Challenges," In 2nd Int'l. Workshop on Overlay Architectures for FPGAs (OLAF2016), Feb. 21, 2016, 6 pg.
Haenel, V., "2.8. Interfacing with C," [online] Scipy Lecture Notes [retrieved Aug. 11, 2017] retrieved from the Internet: <http://www.scipy-lectures.org/advanced/interfacing_with_c/interfacing_with_c.html>, 31 pg.

(Continued)

*Primary Examiner* — Stefan Stoynov
(74) *Attorney, Agent, or Firm* — Cuenot, Forsythe & Kim, LLC

(57) ABSTRACT

A system includes a runtime generator implemented in programmable circuitry of an integrated circuit, wherein the runtime generator is parameterizable at runtime of the integrated circuit to perform at least one of detecting a symbol pattern within a data stream or generating pseudo random number binary sequences. The system can include a processor configured to execute program code, wherein the processor is configured to provide first parameterization data to the runtime generator. In response to receiving the first parameterization data from the processor at runtime of the integrated circuit, the runtime generator implements a first automaton circuit configured to perform the at least one of the detecting the symbol pattern or the generating the pseudo random number binary sequences.

20 Claims, 16 Drawing Sheets

(56) References Cited

OTHER PUBLICATIONS

Catanzaro, B. et al., "Sejits: Getting Productivity and Performance with Selective Embedded JIT Specialization," Programming Models for Emerging Architectures, vol. 1, No. 1, Oct. 2009, pp. 1-10.
Capalija, D. et al., "Tile-based Bottom-up Compilatoin of Custom Mesh-of-Functional-Units FPGA Overlays," In IEEE 24th Int'l. Conf. on Field Programmable Logic and Applications (FPL), Sep. 2, 2014, 34 pg.
"Very high-level programming language," [online] Wikipedia, the free encyclopedia, Jun. 25, 2017, retrieved from the Internet: <https://en.wikipedia.org/w/index.php?title=Very_high-level_programming_language&oldid=787427362>, 2 pg.
"Amazon EC2 F1 Instances," [online] Amazon Web Services, Inc. © 2017 [retrieved Aug. 11, 2017], retrieved from the Internet: <https://aws.amazon.com/ec2/instance-types/f1/>, 14 pg.
Xilinx, Inc., Peter Alfke, "Created Uses of Block RAM", WP335 (v1.0), Jun. 4, 2008, 5 pages, San Jose, CA USA.
Maxfield, M., "Tutorial: Linear Feedback Shift Registers (LFSRs)—Part 1," [online] EE Times © 2018 UBM Electronics, An AspenCore company, Dec. 20, 2006 [retrieved Mar. 13, 2018], retrieved from the Internet: <https://www.eetimes.com/document.asp?doc_id=1274550>, 5 pg.
Lysaght, P. et al., "Runtime Adaptive Generator Circuit," U.S. Appl. No. 15/850,659, filed Dec. 21, 2017, 69 pg., San Jose, CA USA.
"From Regular Expression to NFA to DFA ," [online] SNS Courseware, Compiler design—RE&DFA&NFA, [retrieved Oct. 20, 2017], retrieved from the Internet: <https://tajseer.files.wordpress.com/2014/06/re-nfa-dfa.pdf>, 9 pg.
"Regular Expression to NFA (Non-Deterministic Finite Automata)," [online] HackingOff.com © 2012 [retrieved Mar. 20, 2018], retrieved from the Internet: <http://hackingoff.com/compilers/regular-expression-to-nfa-dfa>, 1 pg.
"Convert simple regular expressions to deterministic finite automaton Regex => NFA => DFA," [online] CyberZHG's Toolbox [retreived Mar. 20, 2018], retrieved from the Internet: <https://cyberzhg.github.io/toolbox/nfa2dfa>, 2 pg.
"Deterministic finite automaton," [online] Wikipedia, the free encyclopedia, Nov. 29, 2017, retrieved from the Internet: <https://en.wikipedia.org/wiki/Deterministic_finite_automaton>, 6 pg.
Nakahara, H. et al., "A regular expression matching circuit based on a decomposed automaton," In International Symposium on Applied Reconfigurable Computing, Mar. 23, 2011, pp. 12 pg.
"Non-Deterministic finite automaton," [online] Wikipedia, the free encyclopedia, Mar. 3, 2018, retrieved from the Internet: <https://en.wikipedia.org/wiki/Nondeterministic_finite_automaton>, 8 pg.
Yamagaki, N. et al., "High-speed regular expression matching engine using multi-character NFA," In IEEE International Conference on Field Programmable Logic and Applications, FPL 2008, Sep. 8, 2008, pp. 131-136.

* cited by examiner

RUNTIME GENERATORS FOR REGULAR EXPRESSION MATCHING AND RANDOM NUMBER GENERATION

TECHNICAL FIELD

This disclosure relates to integrated circuits (ICs) and, more particularly, to implementing runtime generators within an IC that are capable of performing regular expression matching or random number generation.

BACKGROUND

Integrated circuits (ICs) can be implemented to perform a variety of functions. Some ICs can be programmed to perform specified functions. An example of an IC that can be programmed is a field programmable gate array (FPGA). An FPGA typically includes an array of programmable tiles. These programmable tiles may include, for example, input/output blocks (IOBs), configurable logic blocks (CLBs), dedicated random access memory blocks (BRAM), multipliers, digital signal processing blocks (DSPs), processors, clock managers, delay lock loops (DLLs), and so forth.

Each programmable tile typically includes both programmable interconnect circuitry and programmable logic circuitry. The programmable interconnect circuitry typically includes a large number of interconnect lines of varying lengths interconnected by programmable interconnect points (PIPs). The programmable logic circuitry implements the logic of a user design using programmable elements that may include, for example, function generators, registers, arithmetic logic, and so forth.

The programmable interconnect and programmable logic circuitries are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA. Changing the functionality of the FPGA thereafter requires loading different configuration data into the configuration memory cells.

SUMMARY

In one or more embodiments, a system may include a runtime generator implemented in programmable circuitry of an integrated circuit (IC). The runtime generator is parameterizable at runtime of the IC to perform at least one of detecting symbol patterns within data streams or generating pseudo random number binary sequences. The system may include a processor configured to execute program code, wherein the processor is configured to provide first parameterization data to the runtime generator at runtime of the IC. In response to receiving the first parameterization data, the runtime generator implements a first automaton circuit configured to detect a first symbol pattern or generate a first pseudo random number binary sequence.

In one or more embodiments, a method may include implementing a runtime generator within programmable circuitry of an IC and receiving, at the runtime generator, first parameterization data at runtime of the IC. The first parameterization data specifies a first automaton circuit. The method may include implementing the first automaton circuit within the runtime generator in response to the receiving the first parameterization data. The first automaton circuit is capable of performing at least one of detecting a first symbol pattern within a data stream or generating a first pseudo random number binary sequence.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

DETAILED DESCRIPTION OF THE DRAWINGS

Figure 1:
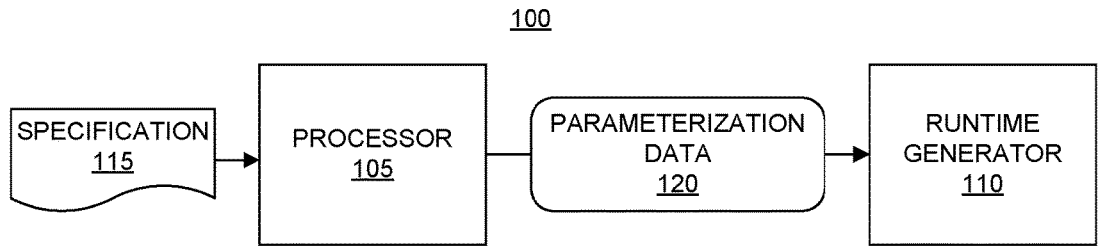
FIG. 1 illustrates an example of a system including a runtime generator.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to integrated circuits (ICs) and, more particularly, to implementing runtime generators within an IC. A runtime generator is a circuit that may be implemented, at least in part, using programmable circuitry of an IC. The runtime generator, once implemented using the programmable circuitry by way of loading a configuration bitstream into the IC, may be parameterized at runtime of the IC to dynamically implement different types or classes of circuits. The parameterization data provided to the runtime generator specifies the particular circuit to be implemented. As such, the runtime generator may be programmed by the parameterization data to implement any of a variety of different circuits (e.g., of various types, classes, or specific implementations) over time.

In one or more embodiments, the runtime generator is capable of implementing finite state machines (FSMs). The runtime generator is parameterizable to implement different FSMs at runtime of the IC as needed and/or desired. The runtime generator may be parameterized to implement different FSMs at runtime of the IC without the need to instantiate any new and/or different circuitry in the programmable circuitry of the IC for each different FSM to be implemented. The runtime generator itself is capable of implementing any of a variety of different FSMs dynamically within the IC. The parameterization data provided to the runtime generator specifies the particular FSMs to be implemented. As such, the runtime generator is effectively programmed by the parameterization data to implement the different FSMs over time.

In one or more embodiments, the runtime generator is implemented as or includes a Boolean function network generator (BFNG). In that case, the runtime generator is parameterizable to implement different Boolean function networks at runtime of the IC as needed and/or desired. As defined herein, a Boolean function network is a circuit that implements two or more Boolean functions. Boolean function networks are described herein in greater detail below. The runtime generator may be parameterized to implement different Boolean function networks at runtime of the IC without the need to instantiate any new and/or different circuitry in the programmable circuitry of the IC for each different Boolean function network to be implemented. The runtime generator itself is capable of implementing any of a variety of different Boolean function networks dynamically within the IC. The parameterization data provided to the runtime generator specifies the particular Boolean function networks to be implemented. As such, the runtime generator is effectively programmed by the parameterization data to implement the particular Boolean function networks over time.

In one or more embodiments, the runtime generator is capable of implementing any of a variety of automaton circuits. In particular embodiments, the automaton circuits are capable of detecting symbol patterns in a received data stream. In other embodiments, the automaton circuits are capable of generating pseudo random number binary sequences.

In one or more embodiments, the runtime generator may include additional circuitry such as a data path circuit and the BFNG to implement a class of nondeterministic FSMs. The data path circuit includes a plurality of stateful circuit elements. The nondeterministic FSMs may be used to perform operations such as regular expression processing. As such, the runtime generator may be programmed by parameterization data to implement any of a variety of the different types and/or classes of nondeterministic FSMs over time without requiring a new configuration bitstream be loaded into the IC.

In one or more embodiments, the runtime generator is capable of utilizing a data path circuit and a BFNG to implement any of a variety of linear, binary sequential circuits (e.g., sometimes referred to herein as "machines"). The data path circuit includes a plurality of stateful circuit elements. Such runtime generators may be parameterized, e.g., changed dynamically at runtime of the IC, without requiring a new configuration bitstream. Examples of the linear, binary sequential circuits that may be implemented by the runtime generator include, but are not limited to, Galois LFSRs, Fibonacci LFSRs, and cellular automaton circuits. An LFSR, whether Galois or Fibonacci, and a cellular automaton circuit, as implemented by the runtime generator, are capable of generating pseudo random number binary sequences.

In one or more other embodiments, the functions performed by the BFNG may be extended to include nonlinear Boolean functions. In such cases, the runtime generator may also implement nonlinear cellular automaton circuits of fixed length. As such, the runtime generator may be programmed by parameterization data to implement any of a variety of the different types and/or classes of Galois LFSRs, Fibonacci LFSRs, linear cellular automaton circuits, and/or nonlinear cellular automaton circuits over time without requiring a new configuration bitstream.

The runtime generator may operate in coordination with a processor. The processor is capable of executing program code that enables the processor to receive a specification as input and convert the specification into the parameterization data used to parameterize, or customize, the runtime generator. The specification defines a particular instance or type of circuit to be implemented by the runtime generator. The parameterization data also specifies the particular instance or type of circuit that is implemented by the runtime generator, but is in a format that may be loaded into the runtime generator. Upon loading the parameterization data into the runtime generator, the runtime generator implements the particular instance or type of circuit specified.

In the case where the runtime generator is capable of implementing an FSM, a specification may define a particular FSM. Accordingly, the parameterization data specifies the particular FSM defined by the specification, but is in a format that is loadable into and/or usable by the runtime generator. Upon loading the parameterization data into the runtime generator, the runtime generator implements the particular FSM defined by the specification. Thus, the runtime generator is capable of implementing any of a variety of different FSMs dynamically during operation of the IC without the need to implement new and/or different circuitry in the IC for each different FSM that is implemented. As an example, a field programmable gate array (FPGA) type of programmable IC may be loaded with a configuration bitstream that implements the runtime generator therein using programmable circuitry. Once implemented, the runtime generator is parameterizable to implement different FSMs over time by loading suitable parameterization data.

For example, once a configuration bitstream is loaded into the IC to implement the runtime generator, first parameterization data specifying a first FSM may be used to parameterize the runtime generator. In response to the parameterization, the runtime generator implements the first FSM. Subsequently, second and different parameterization data specifying a second and different FSM may be loaded into the runtime generator, thereby causing the runtime generator to implement the second FSM. This may be performed while the programmable circuitry of the IC continues to operate uninterrupted without implementing different physical circuitry corresponding to the second FSM.

In the case where the runtime generator implements or includes a BFNG, for example, the specification defines a particular Boolean function network. The parameterization data specifies the particular Boolean function network defined by the specification, but is in a format that is loadable into and/or usable by the runtime generator. Upon loading the parameterization data into the runtime generator, the runtime generator is capable of implementing the particular Boolean function network defined by the specification.

Thus, the runtime generator is capable of implementing any of a variety of different Boolean function networks dynamically during operation of the IC without the need to implement new and/or different circuitry in the IC for each different Boolean function network that is implemented. As an example, an FPGA type of programmable IC may be loaded with a configuration bitstream that implements the runtime generator therein using programmable circuitry. Once implemented, the runtime generator is parameterizable to implement different Boolean function networks over time by loading suitable parameterization data.

For example, once a configuration bitstream is loaded into the IC to implement the runtime generator as, or including, a BFNG, first parameterization data specifying a first Boolean function network may be used to parameterize the runtime generator. In response to the parameterization, the runtime generator implements the first Boolean function network. Subsequently, second and different parameterization data specifying a second and different Boolean function network may be loaded into the runtime generator, thereby causing the runtime generator to implement the second Boolean function network. This may be performed while the programmable circuitry of the IC continues to operate uninterrupted without implementing different physical circuitry corresponding to the second Boolean function network.

In the case where the runtime generator is capable of implementing an automaton circuit (e.g., any of the automaton circuits described herein including, but not limited to, LFSR or a cellular automaton circuit), the parameterization data specifies the particular instance of automaton circuit that is implemented by the runtime generator, but is in a format that may be loaded into the runtime generator. Upon loading the parameterization data into the runtime generator, the runtime generator implements the particular automaton circuit defined by the specification (and/or the parameterization data).

Thus, the runtime generator is capable of implementing any of a variety of different automaton circuits dynamically at runtime of the IC without the need to implement new and/or different circuitry in the IC for each different automaton circuit that is implemented. As an example, an FPGA type of programmable IC may be loaded with a configuration bitstream that implements the runtime generator therein using programmable circuitry. Once the configuration bitstream is loaded into the IC to implement the runtime generator, first parameterization data specifying a first automaton circuit may be used to parameterize the runtime generator. In response to the parameterization, the runtime generator implements the first automaton circuit.

Subsequently, second and different parameterization data specifying a second and different automaton circuit may be loaded into the runtime generator, thereby causing the existing runtime generator to implement the second automaton circuit. This may be performed while the programmable circuitry of the IC continues to operate uninterrupted without implementing different physical circuitry corresponding to the second automaton circuit.

Conventional techniques for implementing an FSM, a Boolean network function, and/or an automaton circuit rely upon creating a different configuration bitstream for each different instance of such circuit to be implemented within the IC. Thus, for the IC to switch from implementing an instance of one of the circuits to a second and different instance of one of the noted circuits, a different configuration bitstream was loaded into the IC to create new circuitry corresponding to the second and different instance of the circuit.

In cases where the runtime generator implements an instance of an FSM, a Boolean network function, and/or an automaton circuit in a larger circuit design under development and is to be modified, conventional techniques require a complete reimplementation of the circuit. The design flow for reimplementing a circuit design, however, may take hours to complete to generate the new configuration bitstream. In accordance with the inventive arrangements described herein, not only may different versions of the circuits be implemented using the same runtime generator (e.g., same configuration bitstream) thereby avoiding time consuming reimplementation, but aspects of a given instance of a circuit may be changed at runtime of the IC without regenerating the circuit design and/or implementing new and/or different circuitry.

Further aspects of the inventive arrangements are described below in greater detail with reference to the figures. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

FIG. 1 illustrates an example of a system 100 including a runtime generator 110. In the example of FIG. 1, system 100 includes a processor 105 and runtime generator 110. Runtime generator 110 may be implemented using programmable circuitry of an IC. As an example, runtime generator 110 may be implemented in the programmable circuitry of an FPGA.

Processor 105 is a circuit that is capable of executing program code. In one or more embodiments, processor 105 is an embedded processor implemented within the same IC that includes the programmable circuitry implementing runtime generator 110. In an example, processor 105 may be implemented as a hardwired processor embedded in the same IC as runtime generator 110. In another example, processor 105 may be implemented as a soft processor implemented using programmable circuitry like runtime generator 110. In the soft processor example, processor 105 may also be embedded in the same IC as runtime generator 110. In the case of a soft processor, processor 105 may be implemented by the same configuration bitstream used to implement runtime generator 110. In one or more other embodiments, processor 105 is implemented within a different system and/or IC than runtime generator 110.

In the example of FIG. 1, a configuration bitstream specifying runtime generator 110 and/or any interface circuitry that couples runtime generator 110 to processor 105 and/or other circuitry is loaded into a programmable IC.

Loading the configuration bitstream into the programmable IC implements runtime generator 110 therein using the programmable circuitry. Runtime generator 110 is, in effect, a user programmable circuit block that is parameterizable (e.g., customizable) at runtime of the IC. As defined within this disclosure, the term "runtime" or "runtime of the IC" refers to a state of operation of a programmable IC where a configuration bitstream has been loaded into the programmable IC causing physical implementation of runtime generator 110 therein.

In one or more embodiments, runtime generator 110 is implemented with a circuit architecture that is capable of implementing FSMs. Runtime generator 110 further may have a circuit architecture that implements, or includes, a BFNG that is capable of implementing different Boolean network functions.

In one or more other embodiments, runtime generator 110 is implemented with a circuit architecture that is capable of implementing a particular class of automaton circuit. For example, in implementing one type of automaton circuit, runtime generator 110 is capable of receiving a data stream and matching symbols within the data stream to one or more predetermined symbol patterns. In the case of runtime generator 110, the predetermined patterns of symbols may be specified using regular expressions.

In one or more embodiments, runtime generator 110 is implemented with a circuit architecture that is capable of implementing any of a variety of deterministic automaton circuits. A deterministic automaton circuit is capable of performing the pattern matching described. A "deterministic automaton circuit" (also referred to as a deterministic finite automaton) is a type of automaton circuit implemented as a particular case of a finite state machine that is capable of accepting and rejecting strings of symbols. A deterministic automaton circuit produces a unique computation for each input string. A deterministic automaton circuit is capable of performing operations such as, for example, pattern matching and lexical analysis.

In one or more other embodiments, runtime generator 110 has a circuit architecture that is capable of implementing nondeterministic automaton circuits. Nondeterministic automaton circuits are also capable of performing the pattern matching described. A "nondeterministic automaton circuit" (also referred to as a nondeterministic finite automaton) is a type of automaton circuit capable of consuming a string of input symbols. For each input symbol, the nondeterministic automaton circuit is capable of transitioning to a new state until all input symbols have been consumed. Unlike a deterministic automaton circuit, a nondeterministic automaton circuit, being nondeterministic, may transition to zero, one, or more than one possible states given a current state and an input symbol. In the case of a nondeterministic automaton circuit, the last input symbol is consumed if and only if there is some set of transitions that will lead to an "accepting state". The nondeterministic automaton circuit rejects if, no matter what transitions are applied, the "accepting state" is not reached.

In one or more embodiments, runtime generator 110 may have a circuit architecture that is capable of implementing pseudo random number binary sequence generators. In one aspect, runtime generator 110 is capable of implementing cellular automaton circuits. Runtime generator 110 may implement cellular automaton circuits using a tiled architecture to be described herein in further detail. In another aspect, runtime generator 110 is capable of implementing LFSRs.

In the example of FIG. 1, processor 105 is capable of executing program code that causes processor 105 to process a specification 115 and generate parameterization data 120 from specification 115. Processor 105 may provide parameterization data 120 to runtime generator 110. In one or more embodiments, processor 105 is capable of generating parameterization data 120 at runtime of the IC. For example, processor 105 is capable of executing an operating system and one or more applications. As an example, processor 105 is capable of executing a modern operating system such as Linux or another suitable operating system. The application(s) executed by processor 105 enable processor 105 to generate parameterization data 120 from specification 115.

Processor 105 is capable of loading runtime generator 110 with parameterization data 120 at runtime of the IC. While runtime generator 110 is implemented in the IC upon loading a configuration bitstream, runtime generator 110 is not operational until processor 105 provides parameterization data 120 to runtime generator 110. Once processor 105 provides parameterization data 120 to runtime generator 110, runtime generator 110 is capable of operating or running independently of other circuit blocks (and/or processor 105) within the IC.

Processor 105 is capable of receiving different specifications, each defining a particular and/or different version or instance of a circuit, and generating corresponding parameterization data that can be loaded into runtime generator 110 at runtime of the IC to implement the version or instance of the circuit defined by the processed specification. In other embodiments, processor 105 is capable of receiving parameterization data from another source and/or system and loading the parameterization data into generator circuit 110.

In one or more embodiments, specification 115 is a high-level software description of an FSM. Examples of high-level software descriptions for specification 115 can include, but are not limited to, high-level programming language (HLL), a high-productivity language (HPL) such as Python, Scala, and/or R, a markup language such as eXtensible Markup Language (XML), or other suitable format.

Listing 1 is an example specification for an FSM. For purposes of illustration, the FSM specification of Listing 1 is specified using an HPL. The example of Listing 1 is specified in Python and, more particularly, as a Python dictionary.

LISTING 1

```
In [5]: fsm_spec_a =  {'inputs': [('clear', 'D0'), ('direction', 'D1')],
                       'outputs': [('alpha', 'D10'), ('beta', 'D11'),
                       ('gamma', 'D12')],
                       'states': ['S0', 'S1', 'S2', 'S3', 'S4', 'S5'],
                       'reset_state': 'S0',
                       'transitions':   [['00', 'S0', 'S1', '000'],
                                         ['01', 'S0', 'S5', '000'],
                                         ['00', 'S1', 'S2', '001'],
                                         ['01', 'S1', 'S0', '001'],
                                         ['00', 'S2', 'S3', '010'],
                                         ['01', 'S2', 'S1', '010'],
                                         ['00', 'S3', 'S4', '011'],
                                         ['01', 'S3', 'S2', '011'],
                                         ['00', 'S4', 'S5', '100'],
                                         ['01', 'S4', 'S3', '100'],
                                         ['00', 'S5', 'S0', '101'],
                                         ['01', 'S5', 'S4', '101'],
                                         ['1-', '*', 'S0', '000']]}
```

The FSM specification shown in Listing 1 defines an FSM called "fsm_spec_a". The FSM specification defines the inputs to "fsm_spec_a" as "Clear" and "Direction". The FSM specification uses tuples to associate an identifier or label with a particular pin of the IC (whether internal or an I/O pin of the IC). The "Clear" input to "fsm_spec_a" is assigned to the pin "D0". The "Direction" input is assigned to the pin "D1". The FSM specification further defines the outputs generated by "fsm_spec_a" as "alpha", "beta", and "gamma". The "alpha" output is assigned to pin "D10". The "beta" output is assigned to pin "D11". The "gamma" output is assigned to pin "D12". The FSM specification further defines the particular states to be included in "fsm_spec_a". The states are "S0", "S1", "S2", "S3", "S4", and "S5". In the example of Listing 1, the reset state is explicitly specified. In other embodiments, the processor is capable of interpreting the reset state as the first state listed in the series of states on line 3.

The FSM specification further defines each possible transition that makes up "fsm_spec_a". In the example of Listing 1, there are 13 transitions. Each transition is specified using four values. The first of the four values for a transition indicates the values received for the inputs to the FSM. The second of the four values for a transition indicates the current state of the FSM when the input values are received. The third of the four values for a transition indicates the next state of the FSM. The last of the four values for a transition indicates the output generated by the FSM. Thus, the first transition line having the values "00, S0, S1, 000" indicates that when the "Clear" input and the "Direction" input each have a value of "0" and the FSM is in state S0, the FSM outputs a value of "000". The first transition line further indicates that the FSM progresses from state S0 to state S1 as the next state.

The example of Listing 1 also illustrates that particular wildcards may be specified in the specification. For example, the last transition with the values "1-", "*", "S0", and "000" indicates that when "Clear" has a value of "1", regardless of the value of "Direction" or the current state, the FSM progresses to the reset state of "S0" and outputs a value of "000". Thus, wildcards can be defined and used in the specification for particular signals and/or states of the FSM.

Listing 2 is another example of an FSM specification. For purposes of illustration, the FSM specification of Listing 2 is specified using an HPL. The example of Listing 2 is specified in Python and, more particularly, as a Python dictionary.

LISTING 2

```
In [4]: fsm_spec_b =   {'inputs': [('x', 'D0'), ('y',
                        'D1'), ('z', 'D2')],
                        'outputs': [('alpha', 'D5')],
                        'states': ['A', 'B', 'C'],
                        'reset_state': 'A',
                        'transitions':    [['1--', 'A', 'A', '0'],
                                           ['-1-', 'B', 'C', '1'],
                                           ['0--', 'A', 'B', '0'],
                                           ['-0-', 'B', 'A', '1'],
                                           ['-11', 'C', 'A', '0'],
                                           ['--0', 'C', 'C', '0']]}
```

Processor 105 is capable of receiving an FSM specification at runtime of the IC as illustrated and described herein and generating parameterization data 120 that, when loaded into runtime generator 110, implements the particular FSM defined by the specification. Parameterization data 120 may include, for example, data that is loaded into various types of memories (e.g., block random access memories (BRAMs) and/or lookup tables), registers used to control multiplexers, and registers used to control switches and/or other circuitry.

Listing 3 is an example specification for a Boolean function network. For purposes of illustration, the Boolean function network specification of Listing 3 is specified using an HPL. In the example of Listing 3, the Boolean function network specification is specified using Python and, more particularly, as a Python list.

LISTING 3

```
bool_funcs = ['B11 = A3 ^ A5 ^ A7 ^ A11 ^ A13',
              'B17 = A2 & A4 & A8 & A10 & A12']
bool_gen.setup(bool_funcs)
bool_gen.run
```

In the example of Listing 3, the Boolean function network specifies two Boolean functions. The first Boolean function defines an output of "B11" generated from 5 inputs which are "A3", "A5", "A7", "A11", and "A13". The first Boolean function, per the Boolean function network specification of Listing 3, is "A3 XOR A5 XOR A7 XOR A11 XOR A13". The second Boolean function has an output of "B17" generated from 5 inputs which are "A2", "A4", "A8", "A10", and "A12". The second Boolean function, per the Boolean function network specification of Listing 3, is "A2 AND A4 AND A8 AND A10 AND A12".

Processor 105 is capable of receiving a Boolean function network specification at runtime of the IC as illustrated and described herein and generating parameterization data 120 that, when loaded into runtime generator 110 that is capable of implementing or including a BFNG, implements the particular Boolean function network defined by the specification. Parameterization data 120 may include, for example, data that is loaded into various types of memories (e.g., BRAMs and/or lookup tables), registers used to control multiplexers, registers used to control switches and/or other circuitry.

In one or more other embodiments, specification 115 defines a particular automaton circuit that is to be implemented by runtime generator 110. As discussed, specification 115 may be specified as a high-level software description defining an automaton circuit.

In one or more embodiments, specification 115 specifies or includes one or more regular expressions. In the example of FIG. 1, a regular expression (also referred to as a REGEX) is capable of fully describing an automaton circuit that may be implemented by runtime generator 110. As an illustrative and nonlimiting example, specification 115 may be specified as the REGEX "A+[AB]{3}D". The example REGEX of "A+[AB]{3}D" means that a sequence of symbol "A" followed by three instances of symbol "A" or symbol "B" followed by symbol "D". Processor 105 generates parameterization data 120 specifying an automaton circuit that is capable of searching for and locating symbol pattern(s) that comply with the REGEX of specification 115.

In particular embodiments, processor 105 is capable of generating parameterization data 120 specifying a nondeterministic automaton circuit from regular expression(s) using a technique such as Thomson's construction. Thomson's construction facilitates the transformation of a regular expression into an equivalent nondeterministic finite automaton. Typically, deterministic finite automatons are considered a special case, but equivalents, of nondeterministic finite automatons. Nondeterministic finite automatons may be converted into deterministic finite automatons.

Accordingly, processor 105 is also capable of generating parameterization data 120 specifying a deterministic automaton circuit from regular expression(s).

In one or more embodiments, e.g., where runtime generator 110 is capable of implementing an LFSR, specification 115 may specify a polynomial (e.g., specifying a binary polynomial counter). In one or more other embodiments, specification 115 may specify a particular number of bits (e.g., size or length) and/or taps for an LFSR type of automaton circuit. In the case where runtime generator 110 is capable of generating pseudo random number binary sequences, processor 105 is capable of generating parameterization data 120 based upon the polynomial and/or taps specified by specification 115.

In one or more other embodiments, specification 115 may specify one or more rules for cells of a cellular automaton circuit as implemented by runtime generator 110. As discussed, both the cellular automaton and LFSR type of automaton circuits are capable of generating random numbers (e.g., pseudo random number binary sequences).

Processor 105 is capable of operating on specification 115 to generate parameterization data 120. Parameterization data 120 may include, for example, data that is loaded into various types of memories (e.g., BRAMs and/or lookup tables), registers used to control multiplexers, and registers used to control switches, comparators, and/or other circuitry. Loading parameterization data 120 into runtime generator 110 causes runtime generator 110 to implement the particular automaton circuit defined by specification 115.

Processor 105 is capable of receiving different specifications, each defining a particular and/or different automaton circuit and generating corresponding parameterization data that can be loaded into runtime generator 110 at runtime of the IC to implement the particular automaton circuit defined by the processed specification. In other embodiments, processor 105 is capable of receiving parameterization data from another source and/or system (e.g., external to the IC) and loading the parameterization data into runtime generator 110.

Figure 2A:
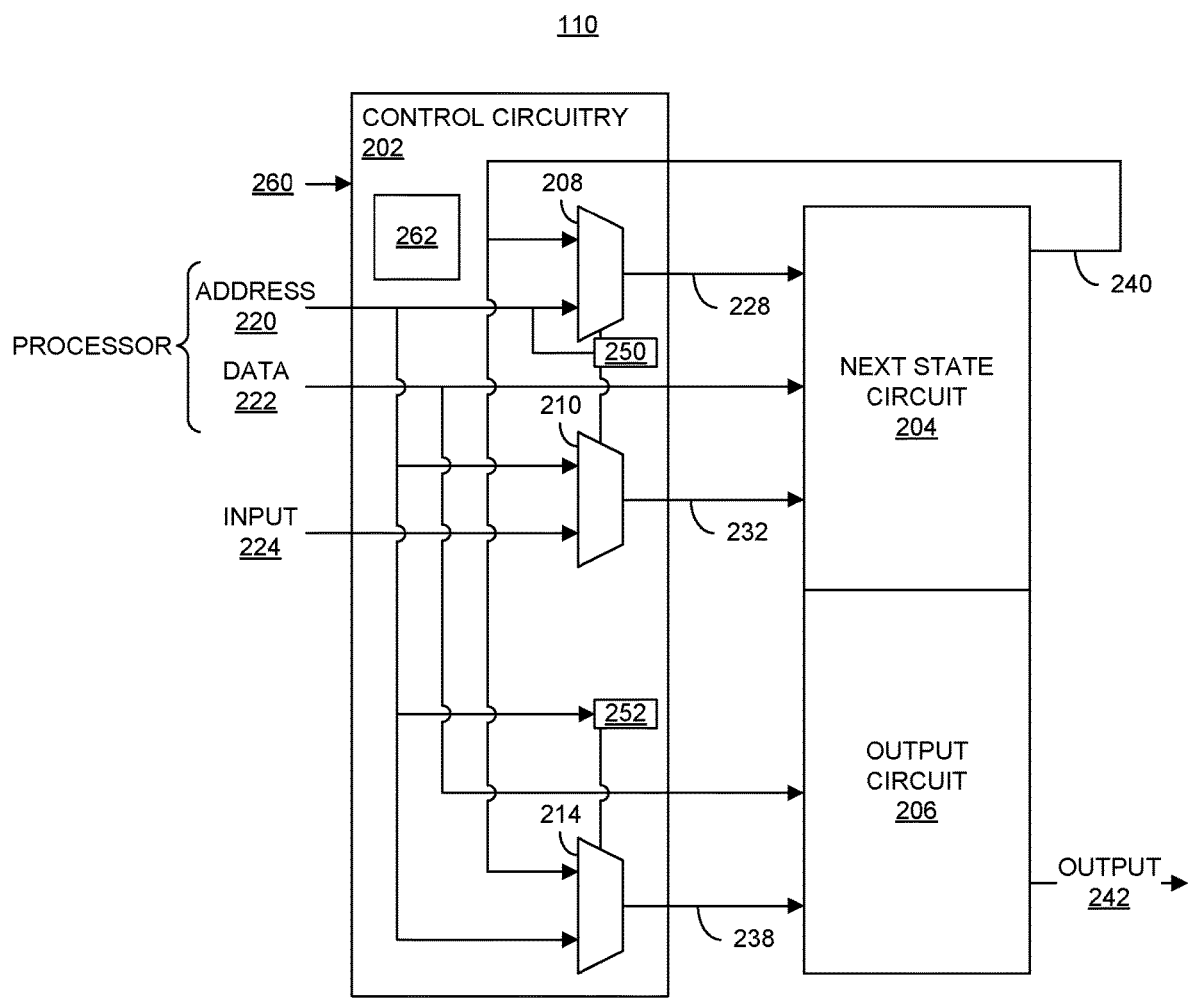
FIG. 2A illustrates an example of a runtime generator.

FIG. 2A illustrates an example implementation of runtime generator 110. In the example of FIG. 2A, runtime generator 110 is capable of implementing a Moore type of finite state machine based upon the parameterization data that is loaded. As such, runtime generator 110 is capable of implementing a deterministic automaton circuit. Runtime generator 110 is customizable at runtime of the IC to implement different user specified FSMs and/or automaton circuits. In the example of FIG. 2, runtime generator 110 includes control circuitry 202, a next state circuit 204, and an output circuit 206.

In one or more embodiments, each of next state circuit 204 and output circuit 206 is implemented using a memory. Next state circuit 204 may also be referred to as "next state logic". As an illustrative and non-limiting example, next state circuit 204 may be implemented using one or more BRAMs, while output circuit 206 is implemented using one or more BRAMs available on a programmable IC.

Regardless of the number of memories and/or BRAMs used, the contents stored in next state circuit 204 and output circuit 206 may be loaded at runtime of the IC using parameterization data provided to runtime generator 110 to implement a particular FSM and/or automaton circuit. New and/or different contents may be loaded into next state circuit 204 and/or output circuit 206 as may be desired or in response to particular conditions at any point during runtime. As such, each time runtime generator 110 receives new and/or different parameterization data, runtime generator 110 may be parameterized to implement a new and/or different FSM and/or automaton circuit.

In the example of FIG. 2A, next state circuit 204 and output circuit 206 are loaded at runtime with parameterization data by multiplexing access to the address and/or data lines provided to each respective circuit structure. In a first mode of operation used to parameterize runtime generator 110, the processor is capable of placing runtime generator 110 in a hold or halted state. For example, the processor may place runtime generator 110 in a halted state via signal 260. In the example of FIG. 2A, the processor provides address signal 220 and data signal 222 to control circuitry 202. One or more bits of address signal 220 may be used to program registers 250 and 252. Register 250 provides select signals to multiplexers 208 and 210. Register 252 provides select signals to multiplexer 214. The select signals specify the particular signals and/or bits of signals that each respective multiplexer will pass.

In the first mode of operation (e.g., where runtime generator 110 is parameterized), the processor writes to registers 250 and 252 to cause control circuitry 202 to pass parameterization data such as address signal 220 to next state circuit 204 and/or output circuit 206. Registers 250 and 252 provide select signals that cause multiplexer 208 to pass address signal 220 as signal 228 to next state circuit 204 and cause multiplexer 210 to pass address signal 220 as signal 232 to next state circuit 204. Similarly, in the first mode of operation, the select signals cause multiplexer 214 to pass address signal 220 as signal 238 to output circuit 206.

In the first mode of operation, next state circuit 204 writes data received via data signal 222 from the processor to the addresses specified by address signal 220 (e.g., passed as signals 228 and 232). Similarly, output circuit 206 writes data received via data signal 222 from the processor to the addresses specified by address signal 220 (e.g., passed as signal 238).

In the example of FIG. 2A, it should be appreciated that address signal 220 and data signal 222 are multibit signals. As such, one or more bits of address signal 220 may be provided to multiplexers 208, 210, and/or 214. Such bits may be the same or different. As such, same or different addresses may be provided to next state circuit 204 and output circuit 206. As data signal 222 is also a multibit signal, the bits (data) provided to next state circuit 204 may be different than the bits (data) provided to output circuit 206.

In general, runtime generator 110 is parameterized by loading the parameterization data into next state circuit 204 and output circuit 206. Once parameterized, runtime generator 110 implements a particular FSM or automaton circuit. Further, once parameterized, runtime generator 110 is capable of operating independently of the processor. With the contents of next state circuit 204 and output circuit 206 loaded, the processor is capable of loading registers 250 and 252 with the values necessary (e.g., a last portion of the parameterization data) to provide multiplexers 208, 210, and 214 with appropriate select signals for the proper operation in the second mode of operation (e.g., as an operable FSM or automaton circuit). Accordingly, the processor is capable of releasing runtime generator 110 from the halted state. The processor may release runtime generator 110 from the halted state via signal 260.

In the second mode of operation, runtime generator 110 is capable of operating independently of the processor to implement the particular FSM or automaton circuit specified by the parameterization data. In the second mode of operation, multiplexers 208, 210, and 214 are configured, via the select signals, to pass one or more bits or all of input signal 224 and/or state vector 240. Thus, in the second mode of operation, multiplexer 208 passes one or more bits of state vector 240 as signal 228 to next state circuit 204. Multiplexer 214 passes one or more bits of state vector 240 as signal 238 to output circuit 206. The number of bits of state vector 240 provided by each of multiplexers 208 and 214 is determined by the select signals from registers 250 and 252 (e.g., the parameterization data). In the second mode of operation, multiplexer 210 passes one or more bits of input signal 224 as signal 232 to next state circuit 204. The number of bits of input signal 224 provided by multiplexer 210 is determined by the select signals from register 250 as programmed by the parameterization data.

In the second mode of operation, next state circuit 204 is capable of determining next states of the particular FSM or automaton circuit now implemented by runtime generator 110. Output circuit 206 is capable of generating output signal 242. As an example, given an initial memory address specified by input signal 224, next state circuit 204 outputs the value stored in next state circuit 204 at the specified memory address. The value read from the memory address specified by input signal 224 is output as state vector 240. State vector 240 specifies, in part, the address corresponding to the next state of the automaton circuit implemented by runtime generator 110. Concurrently, output circuit 206 outputs the value stored in output circuit 206 at memory address specified by state vector 240. The value read from the memory address specified by state vector 240 is output via output signal 242.

In an example where runtime generator 110 is parameterized using a specification as illustrated in Listing 1 or in Listing 2, input signal 224 may carry data provided to runtime generator 110 as input. Runtime generator 110, being parameterized to implement a particular FSM, is capable of transitioning through different states defined by the parameterization data based upon the input signal and/or state vector. Runtime generator 110 outputs data via output 242 per the parameterization data based upon the states.

In an example where runtime generator 110 is parameterized using a regular expression, input signal 224 may carry a data stream of symbols. Runtime generator 110, being parameterized to detect a particular sequence or pattern of symbols specified by the regular expression, evaluates the symbols of the received data stream to determine whether the symbols in the data stream match, or comply with, the regular expression. Output signal 242, for example, is capable of indicating whether, after processing a received data stream, a particular sequence of symbols satisfying the regular expression is detected therein.

Runtime generator 110 is capable of continued operation as described. The particular number of bits (e.g., width) of state vector 240 and input signal 224 used by runtime generator 110 depends upon the values written to registers 250 and 252 to provide appropriate select signals to each of multiplexers 208, 210, and 214.

In one or more embodiments, the BRAMs used to implement next state circuit 204 and output circuit 206 are pipelined and require two clock cycles from the start of operation, e.g., first receiving input signal 224, for data to show up at the outputs (output signal 242). To compensate for the pipelining, one or more dummy states may be provided. The dummy state(s) may be used within each implemented FSM or automaton circuit following the reset state to compensate for pipelining in the BRAMs. In particular embodiments, the number of dummy states inserted into or implemented by the FSM or automaton circuit may depend upon the amount of pipelining in the BRAMs. For example, the number of dummy states implemented by each FSM or automaton circuit may be the number of pipeline stages of the BRAM(s) minus 1. As an illustrative and non-limiting example, a 2 clock cycle latency (e.g., 2 pipeline stages) in the BRAMs would utilize one dummy state, while a 3 clock cycle latency (e.g., 3 pipeline stages) in the BRAMs would utilize two dummy states. Once the FSM or automaton circuit begins and passes through the dummy state(s), the dummy state(s) are only utilized if the FSM or automaton circuit is reset and/or restarted from a particular or selected state.

In one or more embodiments, control circuitry 202 includes an additional control register, or registers, 262. Control register 262 may be written with parameterization data specifying the number of dummy states to implement for a given FSM or automaton circuit. Though not shown, control register 262 may be written via signal 260, 220, 222, or another signal not shown that conveys parameterization data. In particular embodiments, control register 262 is capable of controlling operation of the FSM or automaton circuit implemented by runtime generator 110 to start in a particular or selected state as opposed to the reset state of the FSM or automaton circuit implemented therein. The parameterization data may be written to control register 262 to specify the starting state.

At runtime of the IC, the processor is capable of halting operation of runtime generator 110 and causing runtime generator 110 to re-enter the first mode of operation to load second (e.g., new and/or different) parameterization data specifying a second (e.g., a new and/or different) FSM or automaton circuit. The states and transitions (e.g., BRAM contents of next state circuit 204 and/or output circuit 206), width of input signal 224, and the width of state vector 240 used in implementing the second FSM or automaton circuit may differ from the previously implemented FSM or automaton circuit based upon the second parameterization data. As such, the particular FSM implemented or regular expression that runtime generator 110 is able to match in a received data stream may also differ.

In one or more embodiments, the processor is capable of implementing different FSMs or automaton circuits within runtime generator 110 in response to different conditions (e.g., signals). These conditions may relate to external (e.g., external to the IC) events detected by the processor, the input(s) and/or output(s) of the particular FSM or automaton circuit implemented by runtime generator 110, or other conditions detected within the IC itself.

In one or more other embodiments, the processor is capable of providing parameterization data to runtime generator 110 via another mechanism. In an example, the processor is capable of providing parameterization data to runtime generator 110 via the Processor Configuration Access Port (PCAP) of the IC. In another example, the processor is capable of providing parameterization data to runtime generator 110 via the Internal Configuration Access Port (ICAP) of the IC.

In one or more embodiments, runtime generator 110 may be used as a trigger circuit. For example, runtime generator 110 may be used to detect a pattern of symbols in a received data stream that matches, or complies with, a regular expression. In response to detecting a symbol pattern that matches the regular expression, runtime generator 110 is capable of outputting a signal thereby providing a trigger for another circuit and/or system.

In particular embodiments, one or more additional switches may be included within control circuitry 202 and/or within next state circuit 204 and output circuit 206. The switches allow the sharing of bits of signals (e.g., input 224 and/or state vector 240) with the various ports of the BRAMs used to implement next state circuit 204 and/or output circuit 206. For example, a given port may receive one or more bits of input 224 and/or one or more bits of state vector 240, e.g., a mix of such signals.

Figure 2B:
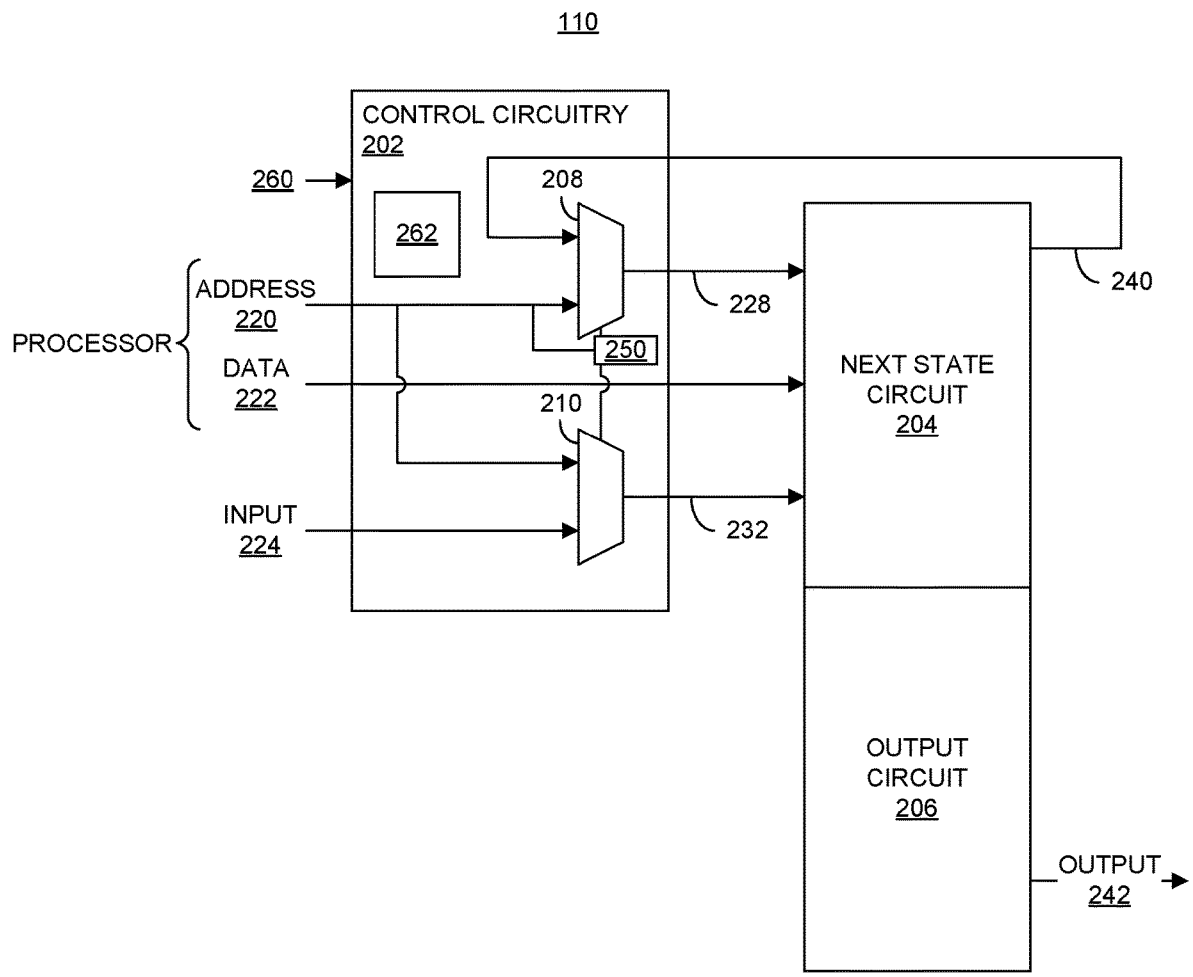
FIG. 2B illustrates another example of a runtime generator.

FIG. 2B illustrates another example implementation of runtime generator 110. In the example of FIG. 2B, runtime generator 110 is capable of implementing a Moore type of finite state machine based upon the parameterization data that is loaded as described in connection with FIG. 2A. Runtime generator 110 of FIG. 2B may operate substantially similar to the example of FIG. 2A. In example 2B, however, a single, dual ported memory may be used to implement both next state circuit 204 and output circuit 206. Because one dual ported memory is used and is parameterized, the number of elements within control circuitry 202 is reduced. In the example of FIG. 2B, runtime generator 110 is capable of implementing a deterministic automaton circuit. Runtime generator 110 is customizable at runtime of the IC to implement different user specified automaton circuits. Like the example of FIG. 2A, runtime generator 110 of FIG. 2B may be parameterized to implement an FSM based upon a specification as illustrated in Listing 1 and/or Listing 2 or perform regular expression matching based upon a specification specifying a REGEX.

Figure 3:
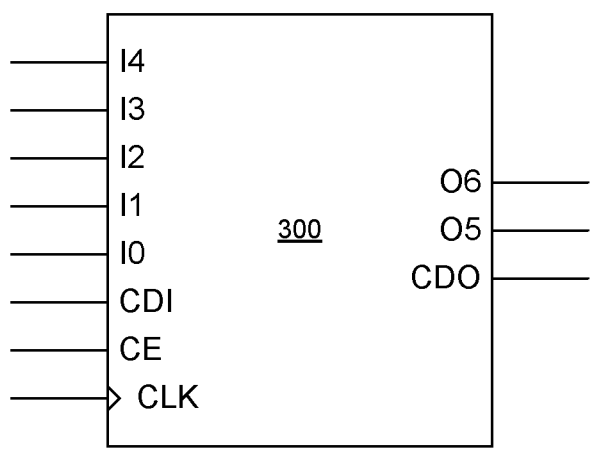
FIG. 3 illustrates an example of a lookup table (LUT) that is configurable at runtime of an IC.

FIG. 3 illustrates an example of a lookup table (LUT) 300 that is configurable at runtime of an IC. LUT 300 is dynamically reconfigurable to change the logic function implemented by LUT 300 during circuit operation (e.g., at runtime of the IC including LUT 300). In the example of FIG. 3, LUT 300 includes 5 inputs labeled I0, I1, I2, I3, and I4. New data can be loaded into LUT 300 during operation, e.g., without loading a configuration bitstream into the IC, through the CDI input. New data can be synchronously shifted into LUT 300 serially to change the logical function implemented by LUT 300.

LUT 300 further includes an output O5 and another output O6. The O6 output produces the logical output function based on the current data loaded within LUT 300 and the currently selected I0-I4 inputs. LUT 300 may also be configured to use the O5 output in combination with the O6 output to create two individual 4-input functions sharing the same inputs or a 5-input function and a 4-input function that uses a subset of the 5-input logic.

The CDO pin of LUT 300 allows two or more such LUT structures to be cascaded by connecting the CDO pin from LUT 300 to the CDI input of the next instance of LUT 300, and so forth. Thus, multiple LUT 300 instances can be chained together by coupling the CDO pins to the CDI pins as described to enable the plurality of LUT 300 instances to be loaded with new data to implement new and/or different logic functions by loading a single serial chain of data. For example, 32-bits of data may be used to configure each instance of LUT 300.

Figure 4:
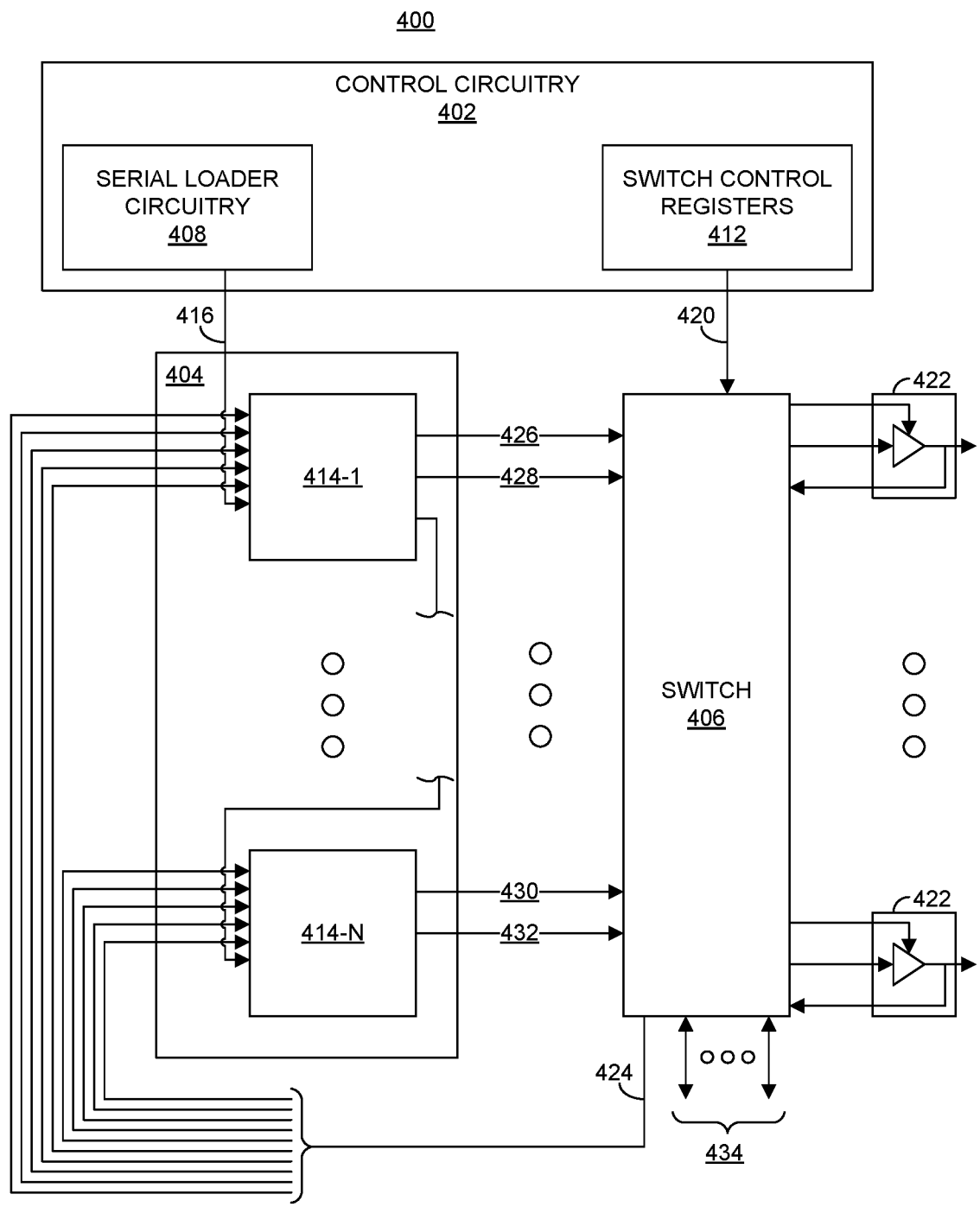
FIG. 4 illustrates an example of a Boolean function network generator (BFNG).

FIG. 4 illustrates an example implementation of a BFNG 400. In one or more embodiments, a runtime generator may be implemented as BFNG 400 and/or to include BFNG 400. For example, a BFNG may be used in implementing another type of deterministic automaton circuit that uses a Mealy type of finite state machine architecture.

In the example of FIG. 4, BFNG 400 is parameterizable at runtime of the IC to implement different user specified Boolean function networks. BFNG 400 is parameterizable at runtime of the IC through the loading of parameterization data from a processor. For example, a specification as described in Listing 3 may be processed to generate parameterization data that may be loaded into BFNG 400. In the example of FIG. 4, the processor, e.g., processor 105, is capable of providing parameterization data to control circuitry 402.

As an example, the processor is capable of receiving a specification as described in connection with FIG. 1. In this case, the specification defines a Boolean function network that is to be implemented by BFNG 400. The processor generates parameterization data from the specification. The processor is capable of loading the parameterization data into control circuitry 402 to implement the Boolean function network defined by the specification. The parameterization data provided to control circuitry 402 includes the data that is used to control LUT circuit 404, the data that is loaded into the LUTs included within LUT circuit 404, and the data used to control switch 406.

In the example of FIG. 4, control circuitry 402 includes serial loader circuitry 408 and switch control registers 412. LUT circuit 404 includes one or more LUTs 414-1 through 414-N. In an example, LUT circuit 404 (e.g., LUTs 414-1 through 414-N) may be implemented using the LUT described in connection with FIG. 3. Serial loader circuitry 408 is capable of providing the data that is loaded into the individual LUTs 414-1 through 414-N through signal 416. The data loaded into the individual LUTs 414-1 through 414-N defines the particular Boolean function performed by each respective one of LUTs 414. In one or more embodiments, the parameterization data provided to serial loader circuitry 408 and loaded into LUTs 414 via signal 416 specifies the minterms of the Karnaugh map that is loaded into each respective one of LUTs 414.

In one or more embodiments, serial loader circuitry 408 provides the data to the CDI input of LUTs 414 via signal 416. For example, signal 416 can be coupled to the CDI input of LUT 414-1 and output from the CDO output of LUT 414-1 and provided to the CDI input of the next LUT, e.g., LUT 414-N of LUT circuit 404. In such embodiments, serial loader circuitry 408 is capable of loading LUTs 414 serially in a daisy chain manner.

In one or more other embodiments, serial loader circuitry 408 is capable of providing multiple independent signals 416, where each different one of signals 416 is provided to a different group of one or more LUTs 414. In that case, serial loader circuitry 408 is capable of including two or more different serial loader circuits where each different serial loader circuit is capable of providing data to a group of one or more LUTs 414. In such embodiments, the time to load LUTs 414 is reduced by a factor equivalent to the number of different serial loader circuits (or LUT groups) used.

Switch control registers 412 are capable of controlling the configuration of switch 406 via signal 420. The parameterization data provided to switch control registers 412 cause each instance of circuit block 422 to operate as an input or as an output. Each of circuit blocks 422, for example, may be coupled to an input/output (I/O) pin of the IC. The I/O pins of the IC may be connected to an interface for communicating with other systems and/or devices located off-chip.

Switch 406 may also include one or more ports on the left side. For example, switch 406 may include ports coupled to signals 426, 428, 430, and 432. Switch 406 may include one or more output ports that are connected to signal 424 and one or more ports coupled to signals 434. The parameterization data provided to switch control registers 412 further may cause different ones of the ports noted to operate as inputs or as outputs and to establish connections between ports and/or instances of circuit block 422. Signals 434, for example, may be coupled to other circuit nodes within the IC that are not I/O pins. Thus, in particular embodiments, switch 406 may be connected to one or more I/O pins, one or more internal nodes of the IC, or a combination thereof.

The parameterization data provided to switch 406 establishes connections between different instances of circuit block 422, ports on the left side of switch 406, the output ports on the bottom edge of switch 406 coupled to signals 424, and/or the ports coupled to signals 434. In this manner, any signal received via ports of switch 406 and/or circuit blocks 422 may be routed through switch 406 to be output as signal 424, e.g., the input signals to BFNG 400. Similarly, any instance of circuit block 422 may be configured as an output and connected to signals 426, 428, 430, 432, and/or 434 to be provided to I/O pins. Any signals received via switch 406 (e.g., 426, 428, 430, 432, and/or signals received via instances of circuit block 422) may be output as signals 434 to other internal nodes of the IC. Thus, based upon signal 420, connectivity among ports within switch 406 is specified. Further, based upon signal 420, whether ports and/or instances of circuit block 422 operate as inputs or as outputs is specified.

In one or more embodiments, switch 406 is further parameterizable to electrically isolate particular signals received from LUT circuit 404 and/or any of the ports of switch 406. For example, based upon the parameterization data, switch 406 is capable of isolating signal 426, 428, 430, 432, and/or 434. When isolated, switch 406 does not propagate the isolated signal to another port and/or instance of circuit block 422.

LUT circuit 404 includes a plurality of LUTs 414-1 through 414-N, where "N" is an integer value of 1 or more. In the example of FIG. 4, LUTs 414 are arranged in parallel with a single stage. In one or more other embodiments, LUTs 414 may be arranged in multiple stages where a first stage of a plurality of parallel LUTs 414 receives input signals 424 (e.g., from switch 406) and a second stage of LUTs 414 receive input signals from the output signals of the first stage of LUTs 414 (e.g., signals 426, 428, 430, and/or 432).

The inclusion of switch 406 allows the input provided to BFNG 400 (e.g., as signal(s) 424) to be selected at runtime and the output provided from BFNG 400 (e.g., signal(s) 434 and/or signals from instances of circuit blocks 422) to be selected at runtime based upon the parameterization data that is provided to control circuitry 402 and, in particular, to switch 406. Further, the particular Boolean function network implemented by LUT circuit 404 is determined at runtime based upon the parameterization data provided to control circuitry 402.

In the example of FIG. 4, control circuitry 402, LUT circuit 404, and switch 406 may be implemented using programmable circuitry of the IC. As such, BFNG 400 may be created within an IC by loading a configuration bitstream specifying the circuit design therein. Once implemented, BFNG 400 is parameterizable (e.g., customizable) at runtime of the IC to implement different Boolean function networks over time without implementing different circuitry within the IC.

In one or more embodiments, the processor may be coupled to output signals of BFNG 400. As such, the particular configuration of BFNG 400 may be modified to implement one or more different Boolean function networks via the loading of parameterization data in response to results output from the BFNG 400. For example, the processor is capable of monitoring data output from BFNG 400 and, in response to detecting a particular condition in the data, implementing a different Boolean function network within BFNG 400.

Figure 5:
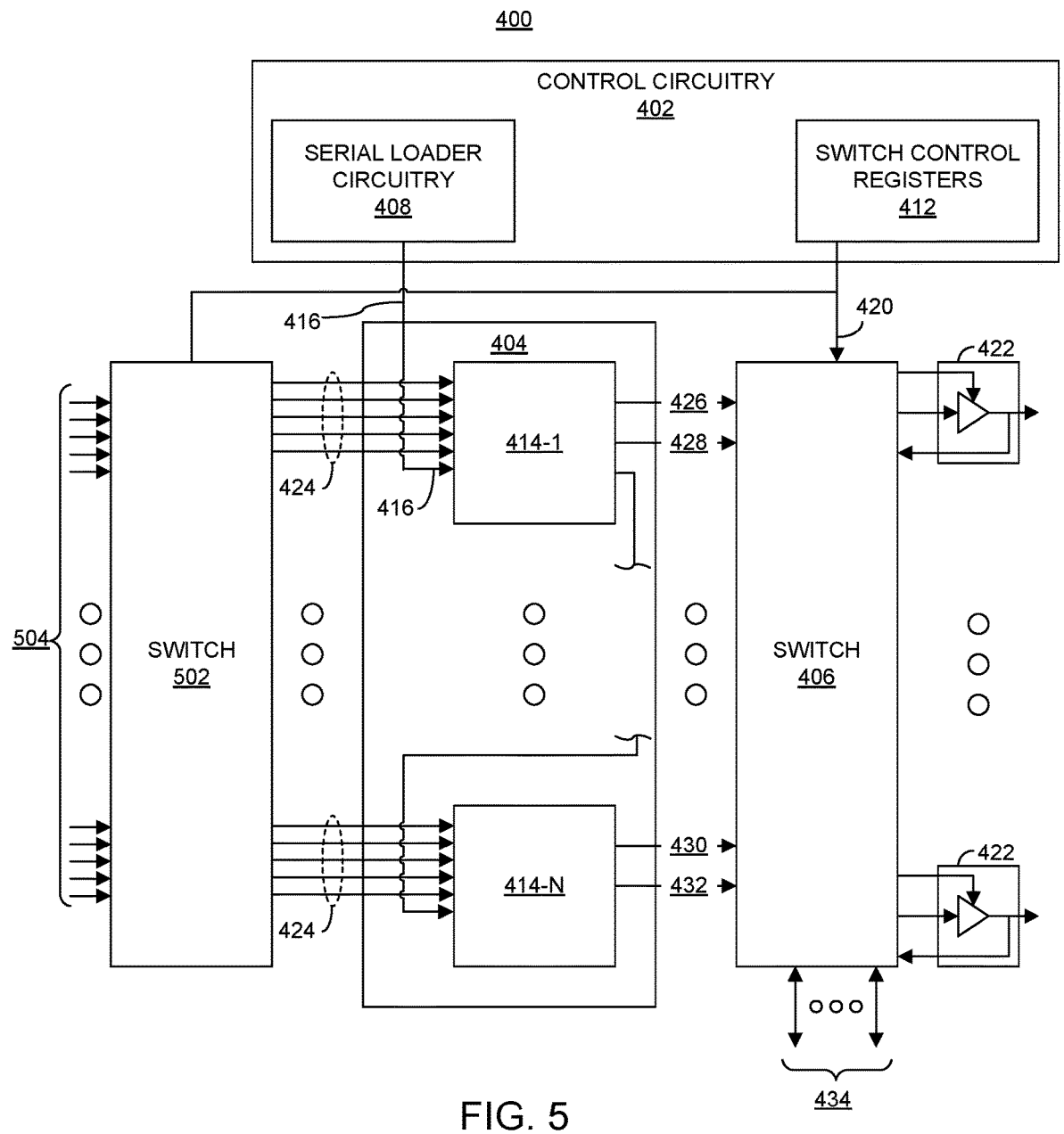
FIG. 5 illustrates another example of a BFNG.

FIG. 5 illustrates another example implementation of BFNG 400. The example shown in FIG. 5 is substantially similar to the example of FIG. 4. In the example of FIG. 5, an additional switch 502 is included. Switch 502 is capable of coupling selected signals 504 to selected signals 424. In the example of FIG. 5, a separate input switch (e.g., switch 502) and a separate output switch (switch 406) are used. Switch 502, like switch 406, may be parameterized via parameterization data. Different nodes may be coupled to signals 504, e.g., internal nodes, I/O pins, or a combination of both, to connect the nodes to signals 424 as inputs to BFNG 400 based upon the parameterization data provided.

In the example of FIG. 5, control circuitry 402, LUT circuit 404, switch 406, and switch 502 may be implemented using programmable circuitry of the IC. As such, BFNG 400 may be created within an IC by loading a configuration bitstream specifying the circuit design therein. Once implemented, BFNG 400 is parameterizable (e.g., customizable) at runtime of the IC to implement different Boolean function networks over time without having to implement different circuitry within the IC.

In one or more embodiments, the processor may be coupled to output signals of BFNG 400. As such, the particular configuration of BFNG 400 may be modified to implement one or more different Boolean function networks via the loading of parameterization data in response to results output from the BFNG 400. For example, the processor is capable of monitoring data output from BFNG 400 and, in response to detecting a particular condition in the data, implementing a different Boolean function network within BFNG 400.

Figure 6:
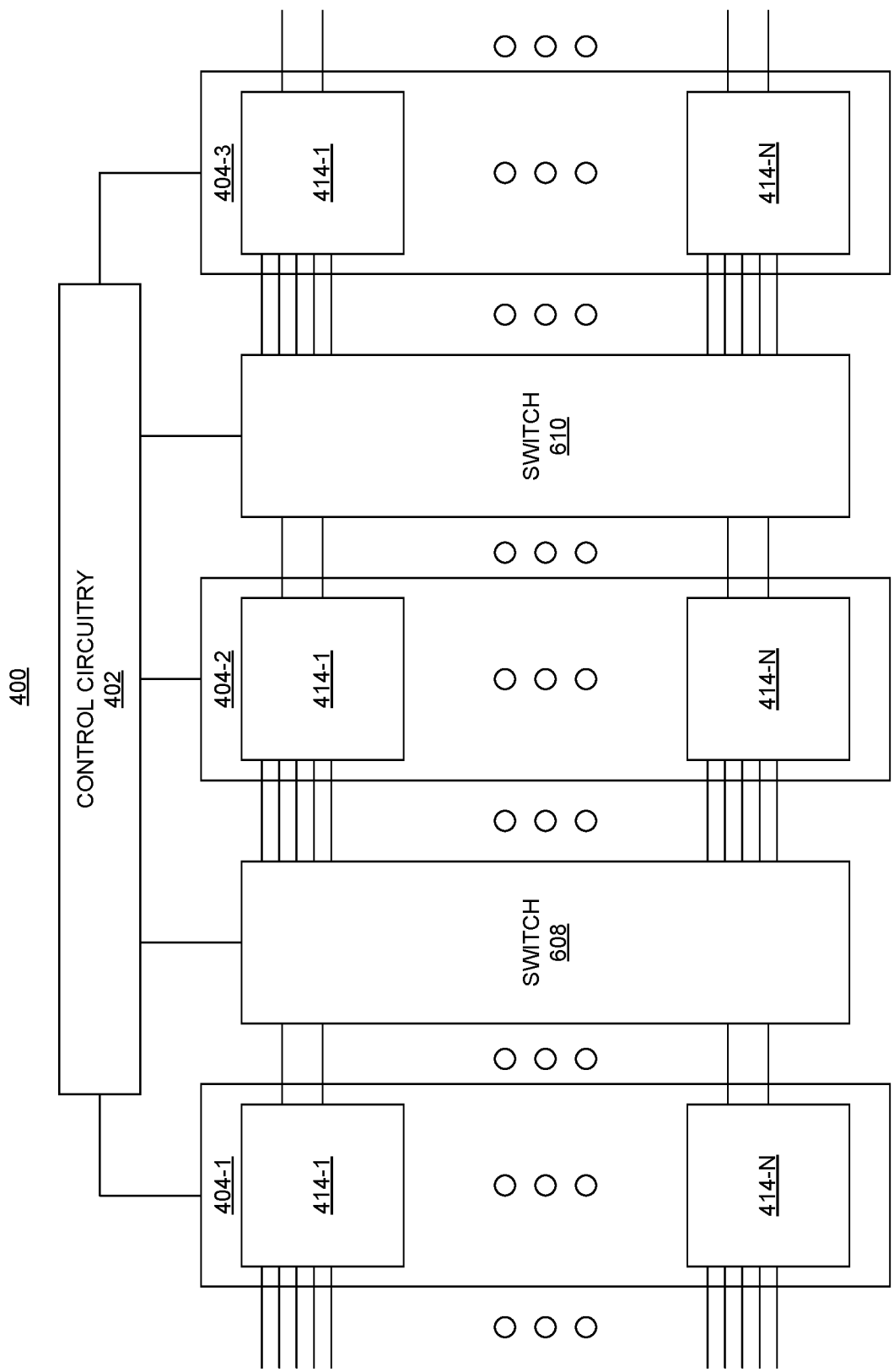
FIG. 6 illustrates another example of a BFNG.

FIG. 6 illustrates another example implementation of a BFNG 400. In the example of FIG. 6, BFNG 400 includes multiple stages of LUT circuits 404. For purposes of illustration, BFNG 400 includes LUT circuits 404-1, 404-2, and 404-3. It should be appreciated that BFNG 400 may include fewer LUT circuits or more LUT circuits than shown. Each of LUT circuits 404 is coupled to the next stage LUT circuit 404 via a switch. LUT circuit 404-1 is coupled to LUT circuit 404-2 via switch 608. LUT circuit 404-2 is coupled to LUT circuit 404-3 via switch 610.

Each of switches 608 and 610 is customizable at runtime of the IC via control circuitry 402. Control circuitry 402 is capable of providing control signals to couple selected inputs of switch 608 to selected outputs of switch 608 and to couple selected inputs of switch 610 to selected outputs of switch 610. Each of LUT circuits 404 is customizable at runtime of the IC via control circuitry 402 to implement different Boolean function networks. For ease of illustration, details of control circuitry 402 are not shown. Control circuitry 402, however, may include control registers for controlling each of LUT circuits 404 and each of switches 608 and 610. A processor is capable of providing the parameterization data to control circuitry 402 during runtime of the IC.

In the example of FIG. 6, the various circuit blocks illustrated for BFNG 400 may be implemented using programmable circuitry of the IC. As such, BFNG 400 of FIG. 6 may be created within an IC by loading a configuration bitstream specifying the circuit design therein. Once implemented, BFNG 400 is parameterizable (e.g., customizable)

at runtime of the IC to implement different Boolean function networks over time without having to implement different circuitry within the IC.

In one or more embodiments, the processor may be coupled to output signals of BFNG 400. As such, the particular configuration of BFNG 400 may be modified to implement one or more different Boolean function networks via the loading of parameterization data in response to results output from the BFNG 400. For example, the processor is capable of monitoring data output from BFNG 400 and, in response to detecting a particular condition in the data, implementing a different Boolean function network within BFNG 400.

FIGS. 4-6 are provided for purposes of illustration and not limitation. As described, BFNG 400 may include one or more stages of LUT circuit 404 and one or more stages of switches separating the LUT circuit stages. A BFNG as described herein may have a first stage that is a LUT circuit or a first stage that is a switch. The LUT circuit and switches may be arranged in alternating fashion. The BFNG further may have a last stage that is a LUT circuit or a last stage that is a switch. For example, BFNG 400 of FIG. 6 may include a switch at the input on the left that feeds LUT circuit 404-1 and may include a switch at the output on the right that is fed by LUT circuit 404-3.

Figure 7:
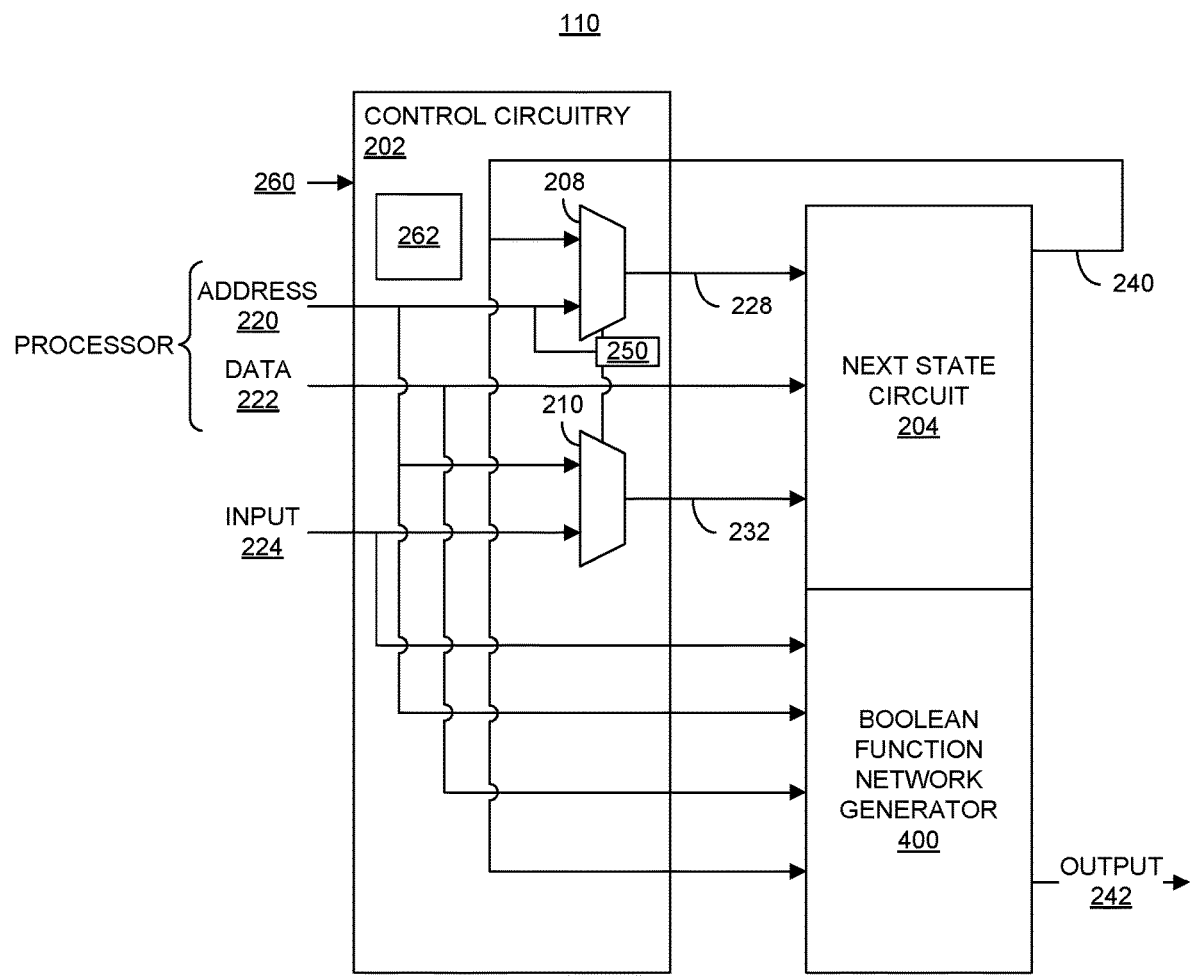
FIG. 7 illustrates an example of a runtime generator including a BFNG.

FIG. 7 illustrates another example implementation of runtime generator 110. In the example of FIG. 7, runtime generator 110 is capable of implementing deterministic automaton circuits using a Mealy type of finite state machine architecture. Runtime generator 110 is parameterizable at runtime of the IC to implement different user specified deterministic automaton circuits. In the example of FIG. 7, runtime generator 110 includes control circuitry 202, a next state circuit 204, and BFNG 400. The parameterization data parameterizes control circuitry 202, next state circuit 204, and BFNG 400.

In one or more embodiments, runtime generator 110 of FIG. 7 may implement an FSM. Accordingly, the specification for runtime generator 110 of FIG. 7 may be specified as shown in Listing 1 or in Listing 2 (for an FSM). In another aspect, the parameterization data may be specified as an FSM as illustrated in Listing 1 and/or Listing 2 in combination with a Boolean function network.

In one or more other embodiments, runtime generator 110 of FIG. 7 may be configured to detect symbol patterns in a data stream. Accordingly, the specification for runtime generator 110 of FIG. 7 may be specified as a regular expression. In another embodiment, the parameterization data may be specified as a regular expression and/or a Boolean function network.

In the example of FIG. 7, runtime generator 110 operates similar to the example of FIG. 2. Next state circuit 204 receives signals 222, 228, and 232. Output circuit 206 is implemented as BFNG 400 instead of a memory (e.g., a BRAM) as previously described. BFNG 400 receives signals 220 and 222 for purposes of parameterization. Signals 220 and 222 may be used to load data into next state circuit 204 and may be provided to control circuitry 402 in order to load contents of LUT circuit(s) 404 and configure switches included within BFNG 400. State vector 240 and input 224 may also be provided to BFNG 400 as inputs to be processed during operation subsequent to parameterization. For example, state vector 240 and input 224 may be coupled to a switch of BFNG 400 that is configured to treat input 224, state vector 240, or any combination thereof as an input to BFNG 400 (e.g., signals 424).

In one or more embodiments, the processor may be coupled to output signals of BFNG 400. As such, the particular configuration of BFNG 400 may be modified to implement one or more deterministic automaton circuits by loading parameterization data into any combination of control circuitry, BRAMs, and/or BNFG 400 in response to results output from the BFNG 400. For example, the processor is capable of monitoring data output from BFNG 400 and, in response to detecting a particular condition in the data, implementing a different Boolean function network within BFNG 400.

In one or more embodiments, runtime generator 110 may be used as a trigger circuit. For example, runtime generator 110 may be used to detect a pattern of symbols in a received data stream that matches, or complies with, a regular expression. In response to detecting a symbol pattern that matches the regular expression, runtime generator 110 is capable of outputting a signal thereby providing a trigger for another circuit and/or system. In the case of a Mealy machine, runtime generator 110 is capable of detecting a particular state (e.g., symbol pattern) and refraining from outputting a signal corresponding to the trigger until a particular condition, such as a change, is also detected on input signal 224.

Figure 8A:
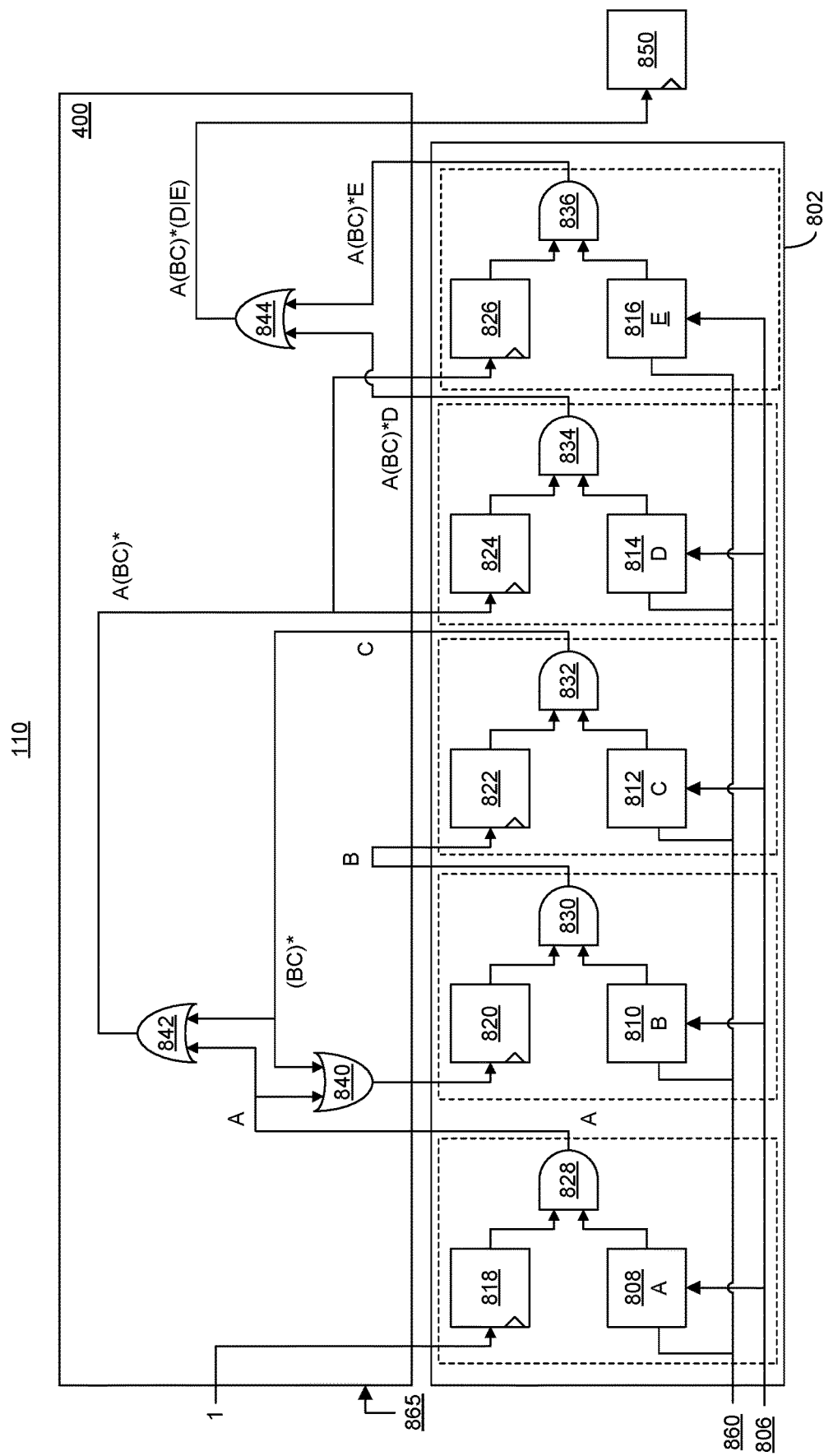
FIG. 8A illustrates an example of a runtime generator capable of implementing nondeterministic automaton circuits.

FIG. 8A illustrates another example implementation of runtime generator 110. In the example of FIG. 8A, runtime generator 110 is capable of implementing different nondeterministic automaton circuits. Unlike a deterministic automaton circuit, a nondeterministic automaton circuit may have zero, one, two, or more possible next states for a given current state and a given input. In the example of FIG. 8, runtime generator 110 includes a data path circuit 802 and BFNG 400. Runtime generator 110 of FIG. 8A is capable of processing regular expressions.

Data path circuit 802 includes a plurality of stateful circuit elements. Examples of stateful circuit elements include, but are not limited to, registers, shift registers, and/or flip-flops. In the example of FIG. 8A, data path circuit 802 is capable of receiving a data stream of symbols via signal 806. The incoming data stream is capable of driving multiple input stages, or tiles, of data path circuit 802 concurrently. Each input stage, illustrated in dashed lines, may be implemented identically. In the example of FIG. 8A, each input stage includes a comparator, an AND gate, and a register. For example, the first input stage includes comparator 808, register 818, and AND gate 828. The second stage includes comparator 810, register 820, and AND gate 830. The third stage includes comparator 812, register 822, and AND gate 832. The fourth stage includes comparator 814, register 824, and AND gate 834. The fifth stage includes comparator 816, register 826, and AND gate 836. Registers 818, 820, 822, 824, 826, and 850 may be implemented as D type registers. For purposes of illustration clock signals into registers 818, 820, 822, 824, 826, and 850 are not shown.

Data path circuit 802 may include fewer or more input stages. In one or more embodiments, data path 802 includes a predetermined number of input stages that may be used to detect further values based upon the particular REGEX expression that is provided as part of the specification. Any input stages that are not used may be excluded from the calculation of whether a match is determined based upon the REGEX provided (e.g., treated as "don't cares").

In this example, the parameterization data provided to runtime generator 110 implements an automaton circuit that is capable of detecting occurrences of a particular symbol pattern within a received data stream. The specification may be the REGEX of A(BC)*(D|E), which specifies the symbol "A" followed by the symbols "BC" zero or more times, followed by the symbol "D" or the symbol "E". Appreciably, the REGEX may specify a different symbol pattern and the symbol pattern used herein is for purposes of illustration only.

Each input stage is parameterized to detect a particular symbol of the REGEX expression. For example, each of comparators 808, 810, 812, 814, and 816 is coupled to signal 806 and receives the incoming data stream concurrently. Comparators 808, 810, 812, 814, and 816 are parameterized via signal 860 to detect the symbols A, B, C, D, and E, respectively. The AND gate of each input stage activates in response to the comparator of the input stage detecting the specified symbol and the register in the input stage also receiving a logic high or "1" signal from BFNG 804.

As pictured, each input stage of data path circuit 802 receives input signal 806. Further, each input stage has an input coupled to BFNG 400 and an output coupled to BFNG 400. Each input stage outputs a signal from the AND gate that enters BFNG 400. BFNG 400 may be parameterized via signal 865 to implement particular Boolean functions and/or Boolean function networks shown. BFNG 400 is parameterizable via signal 865 to establish the connections between the various input stages of data path circuit 802 by implementing particular Boolean functions using outputs from each input stage, and providing signals to drive the clocked register of each input stage thereby enabling the REGEX being implemented by runtime generator 110. The different signal paths flowing into and out of BFNG 400 are labeled with the portions of the REGEX represented by the respective signals.

In this example, based upon signal 865, BFNG 400 implements OR gates 840, 842, and 844. BFNG 400 further is capable of providing a constant logic high or "1" signal to register 818 to enable symbol detection. The inputs of OR gate 840 and of OR gate 842 are coupled to the output of AND gate 828 and the output of AND gate 832. The output of OR gate 840 is coupled to the input of register 820. The output of OR gate 842 is coupled to the input to register 824 and the input to register 826. The inputs of OR gate 844 are coupled to the output of AND gate 834 and the output of AND gate 836. The output of OR gate 844 is coupled to the input of register 850. Register 850 may be the match register. Register 850 is capable of storing a value of 1 in response to the automaton circuit implemented by runtime generator 110 detecting an occurrence of the symbol pattern specified by the REGEX. The clock signal to register 850 is not shown for ease of illustration.

As noted, the portions of the REGEX A(BC)*(D|E) are applied to the different signal paths to illustrate how runtime generator 110 is parameterized based upon the REGEX. In general, once register 818 is enabled, AND gate 828 triggers upon detecting an "A". As such, both OR gate 840 and OR gate 842 are enabled in response to detecting an "A". Further, both OR gate 840 and OR gate 842 are enabled in response to detecting an "A" followed by zero or more "BC". The path including AND gate 830 (corresponding to "B") is directly connected to register 822 (corresponding to "C") via BFNG 400. As shown, OR gate 842 enables the path corresponding to "D" and the path corresponding to "E" concurrently.

In general, runtime generator 110 of FIG. 8A may be implemented (e.g., at compile time) so that BFNG 400 is capable of implementing a maximum of "N" combinatorial functions, where "N" is the number of input stages and symbols in the regular expression. Further, each of the N combinatorial functions will have a maximum of "N" inputs and have one output.

Figure 8B:
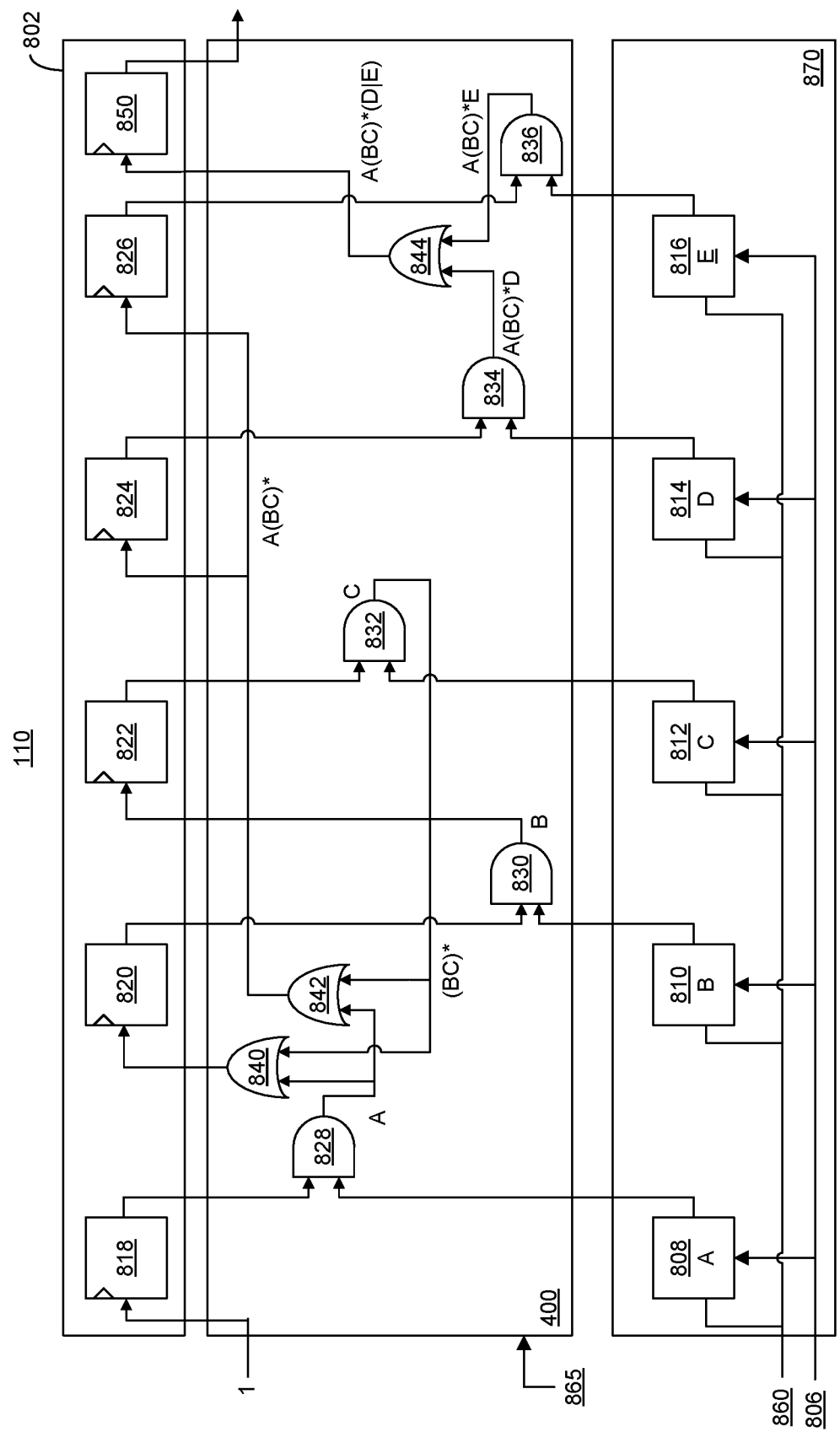
FIG. 8B illustrates another example of a runtime generator capable of implementing nondeterministic automaton circuits.

FIG. 8B illustrates another example implementation of runtime generator 110. In the example of FIG. 8B, AND gates 828, 830, 832, 834, and 836 are implemented in BFNG 400. For purposes of illustration, comparators 808, 810, 812, 814, and 816 are moved out of data path circuit 802 and are included in comparator circuit 870. Further, register 850 is incorporated into data path circuit 802.

FIG. 8B illustrates an example where data path circuit 802 is implemented as an array or sequence of stateful circuit elements. The stateful circuit elements may be implemented as D type registers. Further, the input and output of each stateful circuit element is connected to BFNG 400. A runtime generator having an architecture that includes an array of stateful circuit elements coupled to a BFNG is capable of implementing an entire class of linear, binary sequential circuits that may be changed without loading new configuration bitstreams into the IC. The circuits implemented by the runtime generator may be changed at runtime using parameterization data to change the logic and/or routing as provided or implemented by the BFNG.

Figure 9:
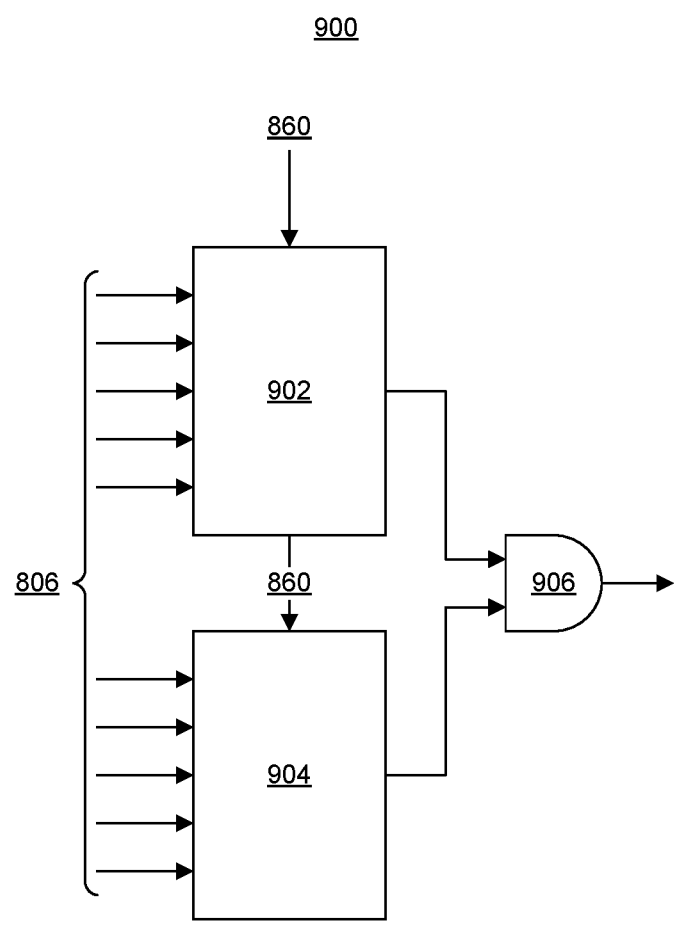
FIG. 9 illustrates an example of a comparator for use with the runtime generator of FIGS. 8A and 8B.

FIG. 9 illustrates an example implementation of a comparator 900 that may be used in the examples of FIGS. 8A and 8B. For example, comparator 900 may be used to implement any one of comparators 808, 810, 812, 814, or 816. In one or more embodiments, each comparator may be formed using one or more lookup tables as described in connection with FIG. 3. In the example of FIG. 9, a 10-bit comparator is implemented using two such lookup tables 902 and 904.

Symbols may be input to comparator 900 through signal 806. Comparator 900 may be parameterized via signal 860. The output of each of lookup tables 902 and 904 is provided to AND gate 906. The output from AND gate 906 indicates whether a particular symbol, e.g., "A" in the case of comparator 808, is detected.

Comparator 900 is shown for purposes of illustration and not limitation. Comparator 900 may be implemented using other types of circuitry that may be parameterized, e.g., programmed or customized, at runtime to recognize a particular symbol. In another embodiment, a 5-bit comparator may be implemented using a single lookup table without AND gate 906. It should be appreciated that a single lookup table as described may be used to implement a comparator of 5 or fewer bits. Similarly, in the case of the circuit structure shown in FIG. 9, such structure may be used to implement a comparator of 10 or fewer bits.

Figure 10:
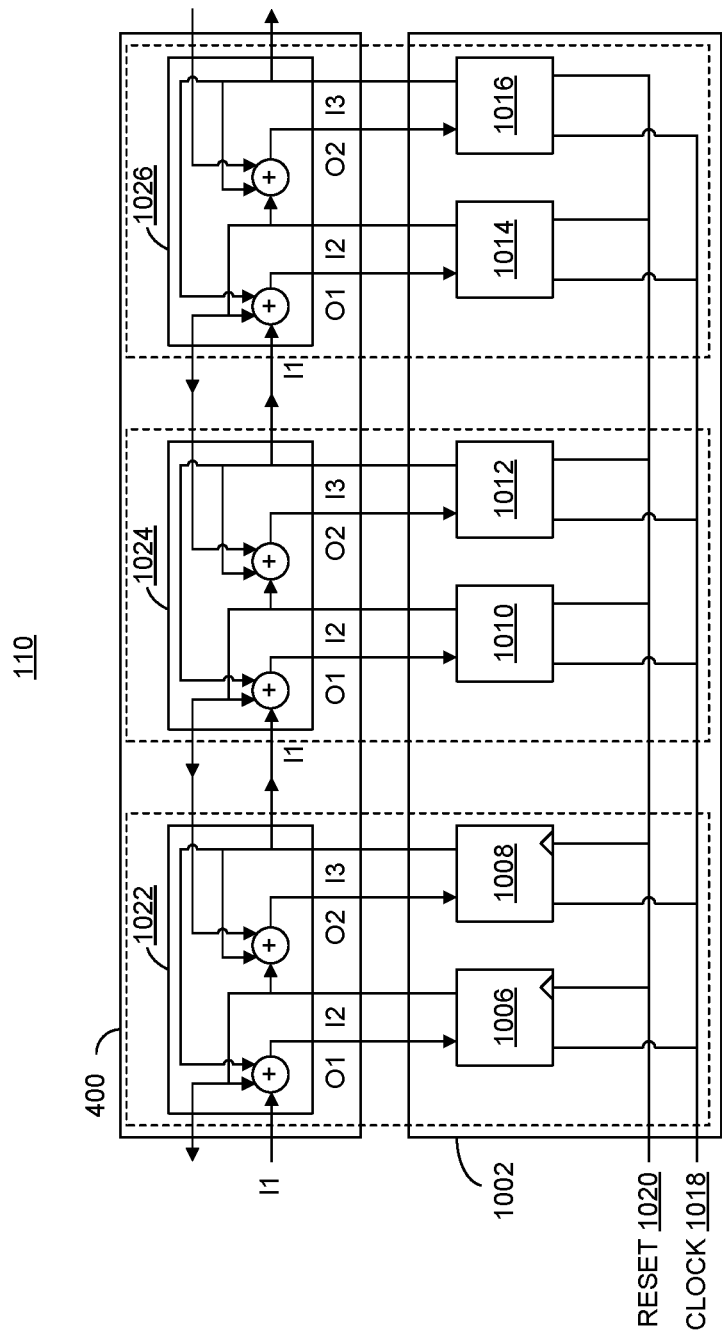
FIG. 10 illustrates an example of a runtime generator capable of implementing cellular automaton circuits.

FIG. 10 illustrates another example implementation of runtime generator 110. In the example of FIG. 10, runtime generator 110 is capable of implementing a cellular type of automaton circuit (e.g., a "cellular automaton"). A cellular automaton is capable of generating pseudo random number binary sequences. For example, runtime generator 110 of FIG. 10 may be used to implement a pattern generator. The example runtime generator of FIG. 10 is capable of implementing any Galois field 2 linear machine.

In the example of FIG. 10, runtime generator 110 includes a data path circuit 1002 and a BFNG 400. Data path circuit 1002 may be implemented using a plurality of registers 1006, 1008, 1010, 1012, 1014, and 1016. Registers 1006-1016 may be implemented as D type registers. In the example of FIG. 10, data does not flow through data path circuit 1002. Rather, each of registers 1006-1016 is connected to clock signal 1018 and to reset signal 1020. Further, each of registers 1006-1016 has an input and an output (e.g., data input and data output) coupled to BFNG 400.

In one or more embodiments, BFNG 400 includes a plurality of LUTs 1022, 1024, and 1026. LUTs 1022-1026 may be implemented as described in connection with FIG. 3. In this regard, the particular function implemented by each respective LUT 1022-1026 may be programmed at runtime. The inputs to each respective LUT 1022-1016 are labeled as "I1", "I2", and "I3". The outputs from each respective LUT 1022-1026 are labeled as "O1" and "O2".

In the example of FIG. 10, runtime generator 110 has a tiled architecture. Each tile is illustrated using a dashed outline. As shown, each tile may be formed of two registers from data path circuit 1002 and a LUT from BFNG 400. In one or more embodiments, each tile is capable of implementing two cells of the cellular automaton. Each cell is associated with a 3-input XOR gate. For example, each of LUTs 1022-1026 is capable of implementing two cells or, in this example, two XOR gates. It should be appreciated that runtime generator 110 may include fewer or more tiles than shown in FIG. 10.

Within each tile, the first cell generates O1 and the second cell generates O2. In the example of FIG. 10, each cell is capable of generating an output based upon two or three signals. The particular function implemented by each cell may be programmed by way of parameterization data at runtime.

For each cell of a cellular automata, the next state of the selected cell can be completely described based on the value of the cell to the left, the value the cell itself, and the value of the cell to the right. Thus, each cell of runtime generator 110 may be programmed to implement a next state function that specifies the output of the cell given the current state of the cell, the state of the cell to the left, and/or the state of the cell to the right. As generally known, when the state function of the $i^{th}$ cell is expressed in the form of a truth table, then the decimal equivalent of the output is referred to as the "rule Ri". Table 1 below illustrates an example of rule 90 and rule 150 that may be implemented by cells of runtime generator 110.

TABLE 1

| | $X_{C-1}(t), X_C, X_{(C+1)}(t)$ | | | | | | | | |
|---|---|---|---|---|---|---|---|---|---|
| | $2^7$ | $2^6$ | $2^5$ | $2^4$ | $2^3$ | $2^2$ | $2^1$ | $2^0$ | Rule |
| | 111 | 110 | 101 | 100 | 011 | 010 | 001 | 000 | # |
| $X_{C-1}(t) \oplus X_{(C+1)}(t)$ | 0 | 1 | 0 | 1 | 1 | 0 | 1 | 0 | 90 |
| $X_{C-1}(t) \oplus X_C \oplus X_{(C+1)}(t)$ | 1 | 0 | 0 | 1 | 0 | 1 | 1 | 0 | 150 |

In general, runtime generator 110 is capable of implementing linear rules and/or non-linear rules. A linear rule is one that employs or uses only XOR and/or XNOR logic. A non-linear rule is one that employs or uses at least some logic other than XOR and/or XNOR logic, e.g., Rule 75.

In the example of FIG. 10, data path circuit 1002, BFNG 400, and connections between data path circuit 1002 and BFNG 400 are implemented by way of configuration data. The functions and connectivity of signals within BFNG 400 are established by programming BFNG 400 with parameterization data that may specify the particular rule to be implemented by each cell of BFNG 400.

Figure 11:
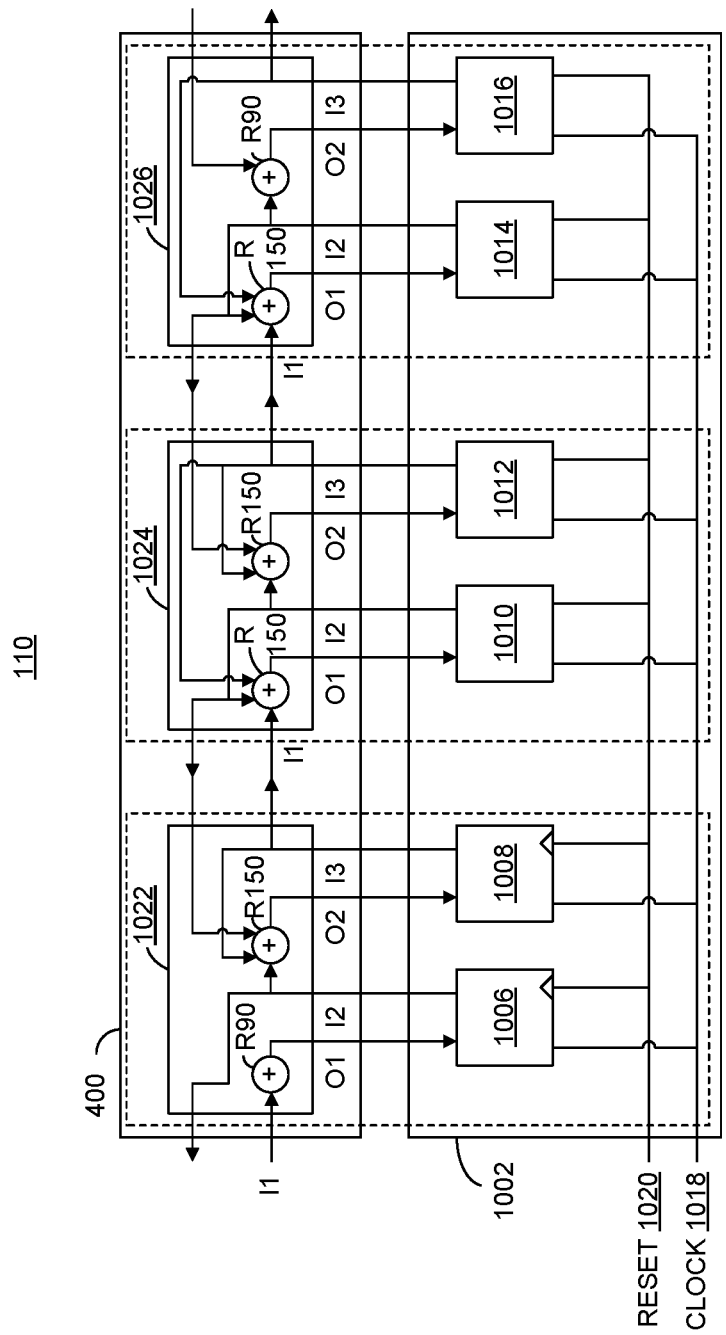
FIG. 11 illustrates the runtime generator of FIG. 10 with a different parameterization.

FIG. 11 illustrates an example parameterization for runtime generator 110 of FIG. 10. In the example of FIG. 11, runtime generator 110 is parameterized so that the connections implemented by BFNG 400 have been changed compared to those illustrated in FIG. 10. Further, in FIG. 11, the particular rule implemented by each XOR gate is shown. In the example of FIG. 11, the particular rule implemented by each respective XOR gate varies based upon the number of inputs provided to that XOR gate per Table 1. It should be appreciated that while certain connections to and/or from certain XOR gates are not shown in FIG. 11, the lack of a connection may be implemented by programming BFNG 400 so that such a signal becomes a "don't care" rather than physically disconnecting the signal.

As discussed, while FIG. 11 illustrates an example where the cellular automaton circuit applies linear rules, the cellular automaton circuit may also implement nonlinear rules or apply any Boolean function to signals that LUTs 1022, 1024, and/or 1026 is capable of performing. For example, utilizing AND and/or OR gates results in nonlinear behavior or rules.

Figure 12A:
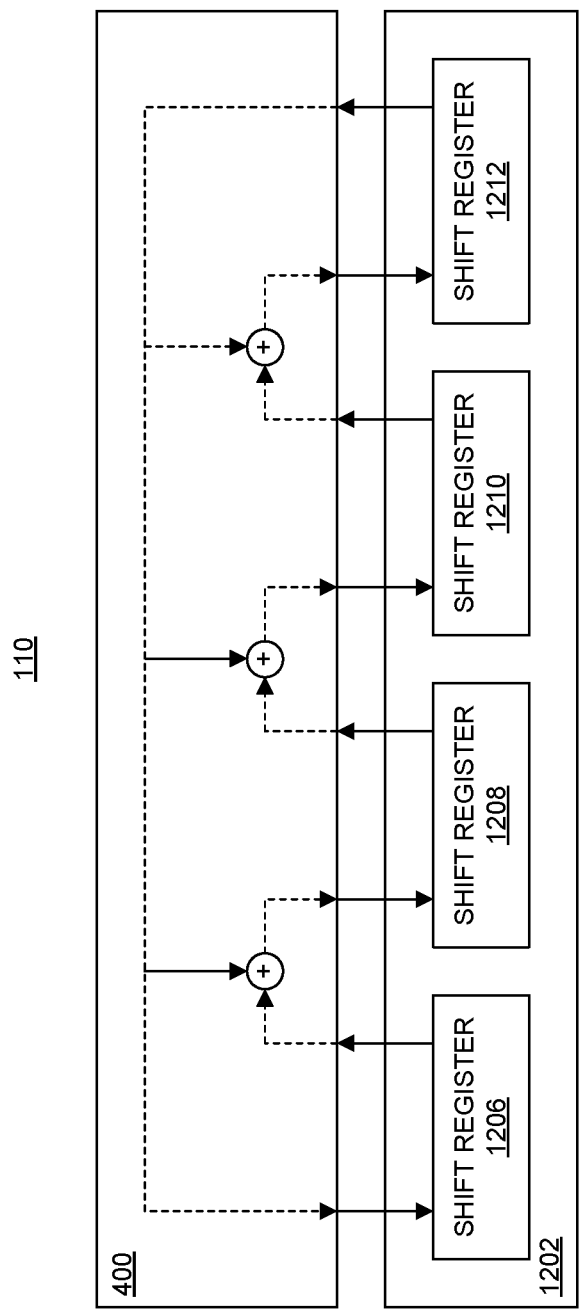
FIG. 12A illustrates an example of a runtime generator capable of implementing linear feedback shift registers (LFSRs).

FIG. 12A illustrates another example implementation of runtime generator 110. In the example of FIG. 12A, runtime generator 110 is capable of implementing an LFSR. The example runtime generator of FIG. 12A is capable of implementing a Galois LFSR or a Fibonacci LFSR. A Galois LFSR typically employs feedforward and/or feedback signal paths. A Fibonacci LFSR typically employs feedback signal paths. An LFSR includes a shift register that has an input bit (e.g., an input signal) that is a linear function of the prior state. An LFSR is capable of generating pseudo random number binary sequences. For example, runtime generator 110 of FIG. 12A may be used to implement a pattern generator. In another example, runtime generator 110 of FIG. 12A may be used to generate pseudo-noise sequences, fast digital counters, and/or whitening sequences.

In the example of FIG. 12A, runtime generator 110 includes a data path circuit 1202. Data path circuit 1202 includes a plurality of stateful circuit elements such as shift registers 1206, 1208, 1210, and 1212. Data path circuit 1202 may include fewer shift registers or more shift registers depending upon the size of the LFSR to be implemented. Each of shift registers 1206-1212 is programmable. Based upon the parameterization data that is loaded into each of shift registers 1206-1212, each shift register is capable of outputting a signal from a particular location or tap in the signal chain within each respective shift register. Each of shift registers 1206-1212 may be programmed independently of the others. In one or more embodiments, shift registers 1206-1212 may be multiple bits in length. For example, each of shift registers 1206-1212 may provide a maximum of 16 bits, 32 bits, or another length and be programmed to output a signal from a selected tap to provide one or more bits up to the maximum available. Shift registers 1206-1212 share a common clock signal (not shown). As an illustrative and non-limiting example, each of shift registers 1206-1212 may be implemented as a shift register lookup table.

Runtime generator 110 further may include BFNG 400. BFNG 400 is capable of applying particular Boolean functions, e.g., XOR functions and/or XNOR functions, to signals to generate inputs provided to shift registers 1206-1212 and/or to process outputs from shift registers 1206-1212. In the example of FIG. 12A, the input bit is driven by the XOR of some bits of the overall shift register value.

The sequence of values generated by an LFSR is determined by the feedback function (XOR versus XNOR) and the tap selection in reference to the location the signal is extracted from the various shift registers 1206-1212. To achieve a loop of a given length or number of states, the number of bits and the taps (e.g., the number of taps and the location of each tap) may be determined (e.g., are known). The taps for a given LFSR of a defined number of bits are identical for both XOR-based and XNOR-based implementations, although the resulting sequence of values generated will differ.

Table 2 below illustrates example configurations for maximal length LFSRs with 2 to 8 bits that may be implemented by runtime generator 110 of FIG. 12A. Table 2 is provided for purposes of illustration only and not limitation. It should be appreciated that runtime generator 110 of FIG. 12A may implement larger LFSRs in the case where each shift register provides a maximum of 16 or 32 bits.

TABLE 2

| Number of Bits | Length of Loop (number of states) | Taps |
|---|---|---|
| 2 | 3 | 0, 1 |
| 3 | 7 | 0, 2 |
| 4 | 15 | 0, 3 |
| 5 | 31 | 1, 4 |
| 6 | 63 | 0, 5 |
| 7 | 127 | 0, 6 |
| 8 | 255 | 1, 2, 3, 7 |

The taps of an LFSR as implemented by runtime generator 110 of FIG. 12A may be expressed in finite field arithmetic as a polynomial mod 2. The coefficients of the polynomial must be either 1s or 0s. The polynomial may also be referred to as the feedback polynomial or reciprocal characteristic polynomial. For example, if the taps are at the 16th, 14th, 13th and 11th bits, the feedback polynomial is $x^{16}+x^{14}+x^{13}+x^{11}+1$. Thus, the specification for an LFSR implemented by a runtime generator may be specified as a series of taps or as a polynomial mode 2 as described.

As pictured, each of shift registers 1206-1212 receives an input from BFNG 400 and provides an output to BFNG 400. The tap from which each shift register provides the output to BFNG 400, which is programmable by way of parameterization data. BFNG 400 is capable of applying an XOR or an XNOR to a received input and some combination of one or more other signals based upon the parameterization data. For cases where fewer taps are needed, BFNG 400 may simply connect an output of one shift register to the input of a next shift register (e.g., without applying a function to the signal). In other cases, the number of bits (e.g., distance) between adjacent taps may be used to determine the tap settings of shift registers 1206-1212.

The connectivity between shift registers, the particular functions (if any) applied to received input signals from shift registers of data path circuit 1202, and/or which other signals are also processed with the received signals from data path circuit 1202 are specified by parameterization data that may be loaded into BFNG 400 at runtime. As such, by selecting the tap on each of shift registers 1206-1212 and determining which functions are applied at each tap location, runtime generator 110 of FIG. 12A may be parameterized at runtime to implement any of a variety of different LFSRs, whether Galois or Fibonacci. Further, runtime generator 110 may be parameterized to generate different LFSRs over time.

In one or more embodiments, two or more runtime generators may be implemented within an IC concurrently. For example, a first runtime generator may be used to implement a cellular automaton, while a second runtime generator may be used to implement an LFSR. The outputs of the two runtime generators may be tied together, e.g., exclusive OR'd to create a random number generator with improved randomness properties. Each of the runtime generators may be parameterized and/or re-parameterized at runtime of the IC to change the random number generator that is implemented.

Figure 12B:
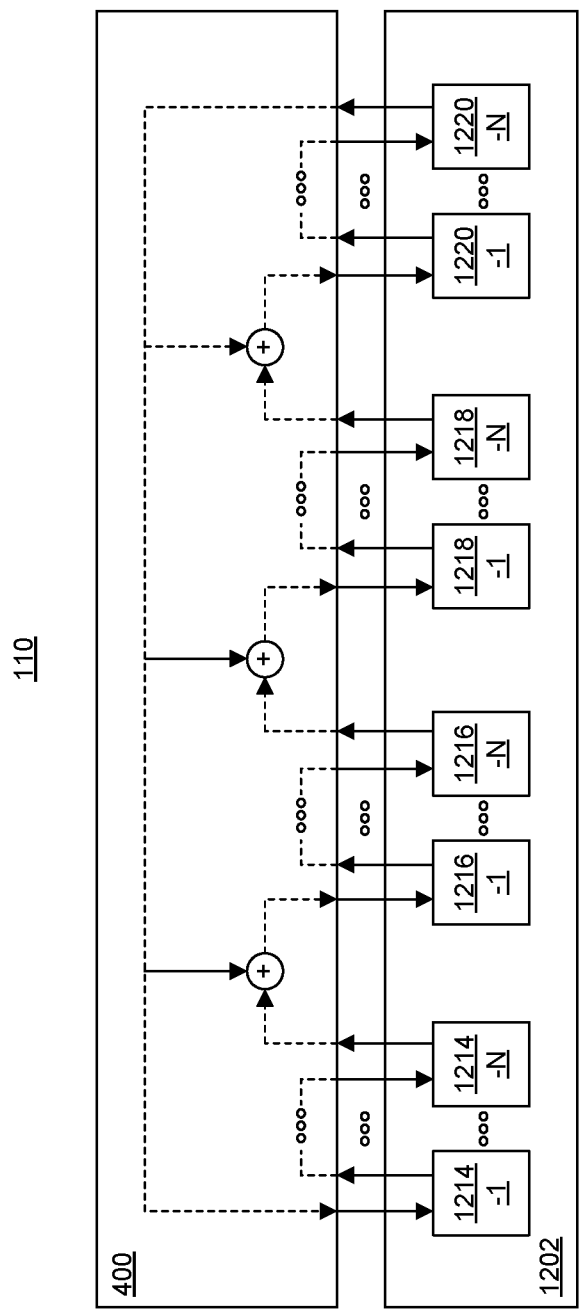
FIG. 12B illustrates another example of a runtime generator capable of implementing LFSRs.

FIG. 12B illustrates another example implementation of runtime generator 110. Runtime generator 110 of FIG. 12B is capable of implementing an LFSR. The LFSR may be a Galois LFSR or a Fibonacci LFSR. The runtime generator of FIG. 12B is substantially similar to the runtime generator of FIG. 12A. In the example of FIG. 12B, however, shift registers 1206, 1208, 1210, and 1212 are replaced within data path circuit 1202 by a plurality of registers illustrated as registers 1214-1 through 1214-N, registers 1216-1 through 1216-N, registers 1216-1 through 1218-N, and registers 1220-1 through 1220-N. Registers 1214, 1216, 1218, and 1220 may be D type registers.

Each of registers 1214, 1216, 1218, and 1220 has an input and an output connected to BFNG 400. BFNG 400 is parameterized to establish connectivity between the registers and/or to apply Boolean functions (e.g., XOR and/or XNOR) to received inputs (e.g., register outputs and/or other signals). For purposes of illustration, BFNG 400 establishes connectivity between registers 1214-1 and 1214-N, e.g., connects the registers in serial, but does not apply any function between the output of register 1214-1 and the input of register 1214-N. Similarly, BFNG 400 establishes connectivity between registers 1216-1 and 1216-N, e.g., connects the registers in serial, but does not apply any function between the output of register 1216-1 and the input of register 1216-N. BFNG 400 establishes connectivity between registers 1218-1 and 1218-N, e.g., connects the registers in serial, but does not apply any function between the output of register 1218-1 and the input of register 1218-N. Further, BFNG 400 establishes connectivity between registers 1220-1 and 1220-N, e.g., connects the registers in serial, but does not apply any function between the output of register 1220-1 and the input of register 1220-N.

BFNG 400 applies the processing shown between the output of register 1214-N and the input of register 1216-1, between the output of register 1216-N and the input of register 1218-1, between the output of register 1218-N and the input of register 1220-1, and establishes a connection from the output of register 1220-N to the input of register 1214-1. The various connections and functions applied, which includes the location at which such functions are applied and the signals provided to the various functions, are defined by the parameterization data as described in connection with FIG. 12A. By including a sufficient number of registers, any of a variety of shift registers architectures as illustrated in FIG. 12A may be realized using registers.

Figure 13:
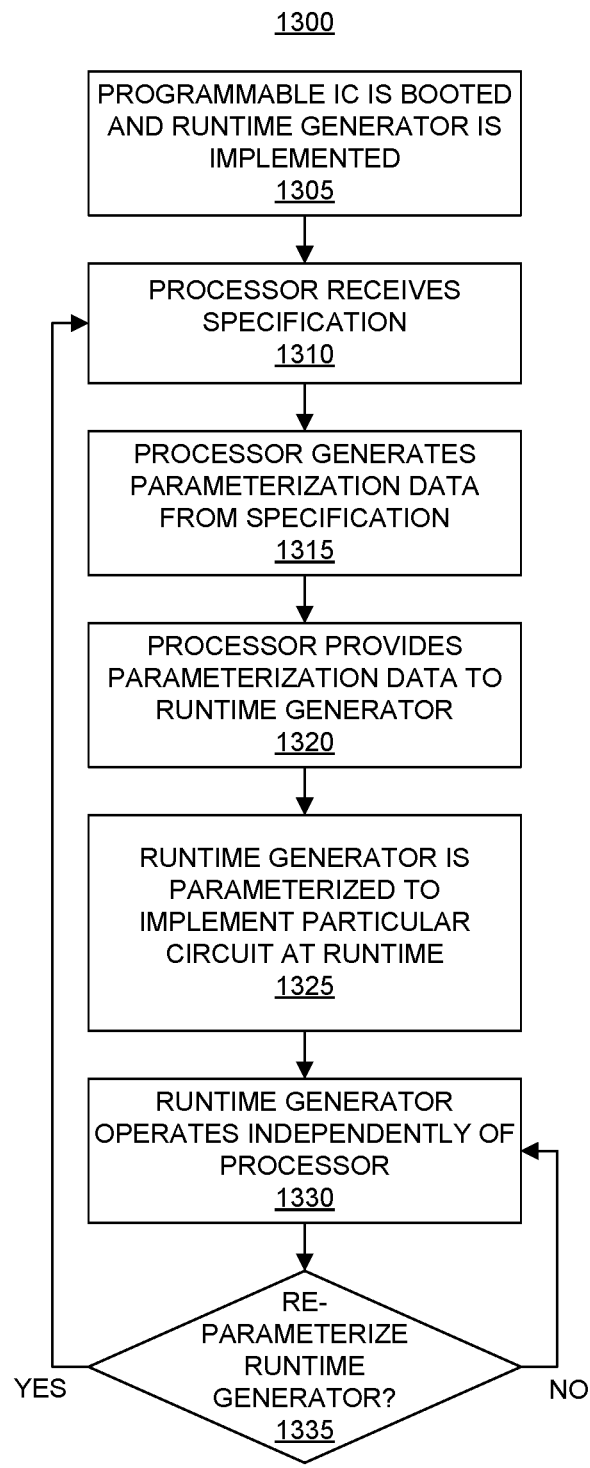
FIG. 13 illustrates an example method of implementing and using a runtime generator.

FIG. 13 illustrates an example method 1300 of implementing and using a runtime generator. FIG. 13 may be performed by a processor and a programmable IC as described herein. In one or more embodiments, the processor is embedded within the programmable IC. The processor may be implemented as a hardwired processor or as a soft-processor. In one or more other embodiments, the processor is external to the programmable IC.

In block 1305, the programmable IC is booted and the runtime generator is implemented. For example, the programmable IC is powered on. Further, a configuration bitstream that specifies a particular runtime generator is loaded into the programmable IC. The configuration bitstream may specify a runtime generator capable of implementing an FSM, a BFNG, an automaton circuit, a cellular automaton, or an LFSR. With the configuration bitstream loaded into the programmable IC and the runtime generator implemented within the programmable circuitry of the programmable IC, the IC is considered to be in a runtime state. It should be appreciated that any interface circuitry that couples the runtime generator to a processor and/or other circuit nodes within the programmable IC is also implemented by virtue of loading the configuration bitstream. For example, the runtime generator may be included within a larger circuit design implemented within the programmable IC.

In block 1310, the processor optionally receives a specification. The processor is capable of executing program code such as an operating system and various applications. An application executed by the processor is capable of receiving a specification for an FSM, a Boolean network function, a REGEX, taps or a polynomial, rules for a cellular automaton, or any of the various other formats described herein. The specification may be read from a memory, e.g., a runtime memory, accessible to the processor and/or may be received from another remote system or device.

In one or more embodiments, the processor is capable of performing one or more verification operations on the received specification. As an example, the processor is capable of determining whether the number of inputs and the number of outputs defined by the specification is compatible (e.g., does not exceed) the number of available inputs and outputs of the runtime generator that is implemented within the programmable circuitry of the IC.

In block 1315, the processor optionally generates parameterization data for the runtime generator from the specification. In the case of a deterministic automaton circuit, the runtime generator may use either a Moore type or a Mealy architecture. In the case of a Moore type finite state machine or automaton architecture (e.g., FIG. 2), the processor is capable of generating the bits used to program the BRAMs, configure the control circuitry, and configure any switches that may be used. Further, the processor is capable of using any of a variety of different encoding techniques such as Gray coding encoding or other suitable encoding schemes. In the case of a BFNG, the processor is capable of generating parameterization data for controlling the LUT circuit(s) and/or switches (e.g., FIGS. 4, 5, and/or 6). In the case of a Mealy type finite state machine or automaton architecture (e.g., FIG. 7), the processor is further capable of generating the parameterization data necessary to program the BFNG (e.g., the control circuitry, the LUT circuit, and any switches).

In the case where the automaton circuit being implemented is nondeterministic (e.g., FIG. 8), the processor is capable of generating the parameterization data to parameterize the comparators of the data path circuit and the combinatorial circuit block that establishes connectivity among the input stages of the data path circuit. In the case where the automaton circuit is a cellular automaton, the processor is capable of generating the parameterization data to parameterize the BFNG to implement the rules for each of the cells. In the case where the automaton circuit is a LFSR, the processor is capable of generating the parameterization data to specify the tap settings and parameterize the BFNG.

In the case where the processor is embedded in the same IC as the runtime generator, the processor is capable of generating the parameterization data used to configure the runtime generator at runtime of the IC and locally within the IC. Thus, the processor is capable of generating the parameterization data within the programmable IC itself without the need for other design tools and/or compilers.

In one or more embodiments, the processor is capable of receiving parameterization data for parameterizing the runtime generator from another source rather than generating the parameterization data from a specification. The parameterization data may be retrieved from a memory or may be received from another system or device such as a remote system or server.

In block 1320, the processor provides the parameterization data to the runtime generator. For example, the processor is capable of providing the control signals necessary to halt operation of the runtime generator (if already operating) and load the parameterization data into any control registers and/or other circuit structures as described. The parameterization data may be provided to the control circuitry of the runtime generator. The control circuitry is capable of disseminating the parameterization data to the various circuit elements within the runtime generator as the case may be.

In block 1325, the runtime generator is parameterized to implement a particular automaton circuit at runtime of the IC. In response to loading the parameterization data, the runtime generator implements the particular circuit specified by the specification and/or the parameterization data (e.g., FSM, automaton circuit, cellular automaton, LFSR, or BFNG). Having provided the parameterization data to the runtime generator, the runtime generator is ready, e.g., customized, for operation within the programmable IC. Accordingly, in the case of an automaton circuit, for example, depending upon the type and/or class implemented, the runtime generator is capable of performing pattern matching (e.g., detecting symbol patterns matching a REGEX) and/or pattern generation.

In block 1330, the runtime generator operates independently of the processor. The processor, for example, is capable of releasing the runtime generator from the halt state. In the case of pattern matching, the runtime generator operates on the received data stream as described and indicates whether the particular patterns and/or sequences of symbols are detected. In the case of pattern generation, the runtime generator begins operating at a particular state.

In block 1335, the processor determines whether the runtime generator is to be re-parameterized. If so, method 1300 loops back to block 1310 to continue processing. If not, method 1300 loops back to block 1330, where the runtime generator continues to operate independently of the processor.

In one or more embodiments, in response to determining that the runtime generator is to be re-parameterized, the processor may receive parameterization data from another source so that the parameterization data may be loaded into the runtime generator. In that case, the processor receives parameterization data that may be loaded and need not first generate the parameterization data from a specification. In one or more other embodiments, in response to determining that the runtime generator is to be re-parameterized, the processor is capable of generating further parameterization data from a different specification.

FIG. 13 illustrates an embodiment where the processor may be used to control a feedback loop that selectively implements different automaton circuits. The processor may be configured to monitor particular signals and/or data, whether trace data, signals from other portions of the IC, signals received from external sources (e.g., off-chip), and/or any combination thereof to detect particular conditions (e.g., signal states). In response to the conditions, the processor initiates the loading of new and/or different parameterization data into the runtime generator. The processor may be used to iterate through different automaton circuits as the case may be.

In one or more other embodiments, the processor may be programmed to evolve and/or refine a specification based upon interaction with one or more internal signals and/or one or more external inputs to the programmable IC. For example, the processor is capable of monitoring one or more signals and, in response to detecting particular conditions with the signal(s), modifying an existing specification for an automaton circuit. The processor, for example, may include a machine learning application that is capable of adapting (e.g., changing or modifying) a specification (e.g., a REGEX) for an automaton circuit based upon a particular signal or signals monitored by the processor during runtime of the IC.

As an example, the processor is capable of monitoring one or more signals of the runtime generator. The processor, for example, is capable of monitoring trace data stored in a memory. In response to detecting a particular condition from the trace data, the processor is capable of implementing a different automaton or any other type of circuit that may be implemented by the particular runtime generator within the IC by loading different parameterization data therein. The parameterization data may be obtained from another source or generated by the processor from a selected specification.

In another example, the processor may be executing an application that is capable of re-parameterizing the runtime generator. The application may detect an event that is unrelated to monitoring particular signals of the runtime generator. For example, the event may be a request for a different automaton circuit that is received from another system and/or circuit coupled to the processor.

As another illustrative and non-limiting example, the runtime generator may be controlled by the processor to enable different analysis paths within the IC. The processor may analyze data to detect a particular pattern (or use a particular trigger condition). If the pattern is not detected within a specified amount of time, the processor may re-parameterize the runtime generator to search for a different pattern (e.g., a different trigger condition). In this manner, the processor is capable of using time as a trigger condition for re-parameterizing the runtime generator.

In one or more embodiments, the processor is capable of selecting the particular automaton circuit to be implemented within the runtime generator based upon the particular condition that is detected. For example, the processor is capable of storing a plurality of different specifications (or sets of parameterization data) for different automaton circuits. The different specifications (or sets of parameterization data) may be associated with different conditions or events. In response to detecting a particular event, the processor determines the specification associated with the event and generates parameterization data from the specification. The processor then loads the parameterization data (or available set of parameterization data) into the runtime generator.

In another example, the processor is capable of implementing a new and/or different automaton circuit at any time, including runtime of the IC. The processor may execute software that, in response to one or more other systems (e.g., live systems) operating in real time enable new automaton circuit to be designed and deployed as part of a feedback loop within a system that is programmed to respond to changes in the computing system environment. The inventive arrangements described herein also support the modification of an automaton circuit when implemented as a runtime generator subsequent to release of the programmable IC into the field without having to provide a new configuration bitstream to the programmable IC.

While FIG. 13 describes various scenarios where the parameterization of the runtime generator is performed automatically, in one or more other embodiments, the parameterization of the generator circuit may be performed in response to user requests. For example, the processor, whether embedded or not, may execute development tools that a designer may access and interact with to change the particular automaton circuit implemented within the runtime generator at any given time. The user may provide a command to the processor to load a new specification that the processor may process to generate parameterization data that is then provided to the runtime generator. As such, a user is able to design new automaton circuits (or modify existing automaton circuits) using software running on the processor.

Figure 14:
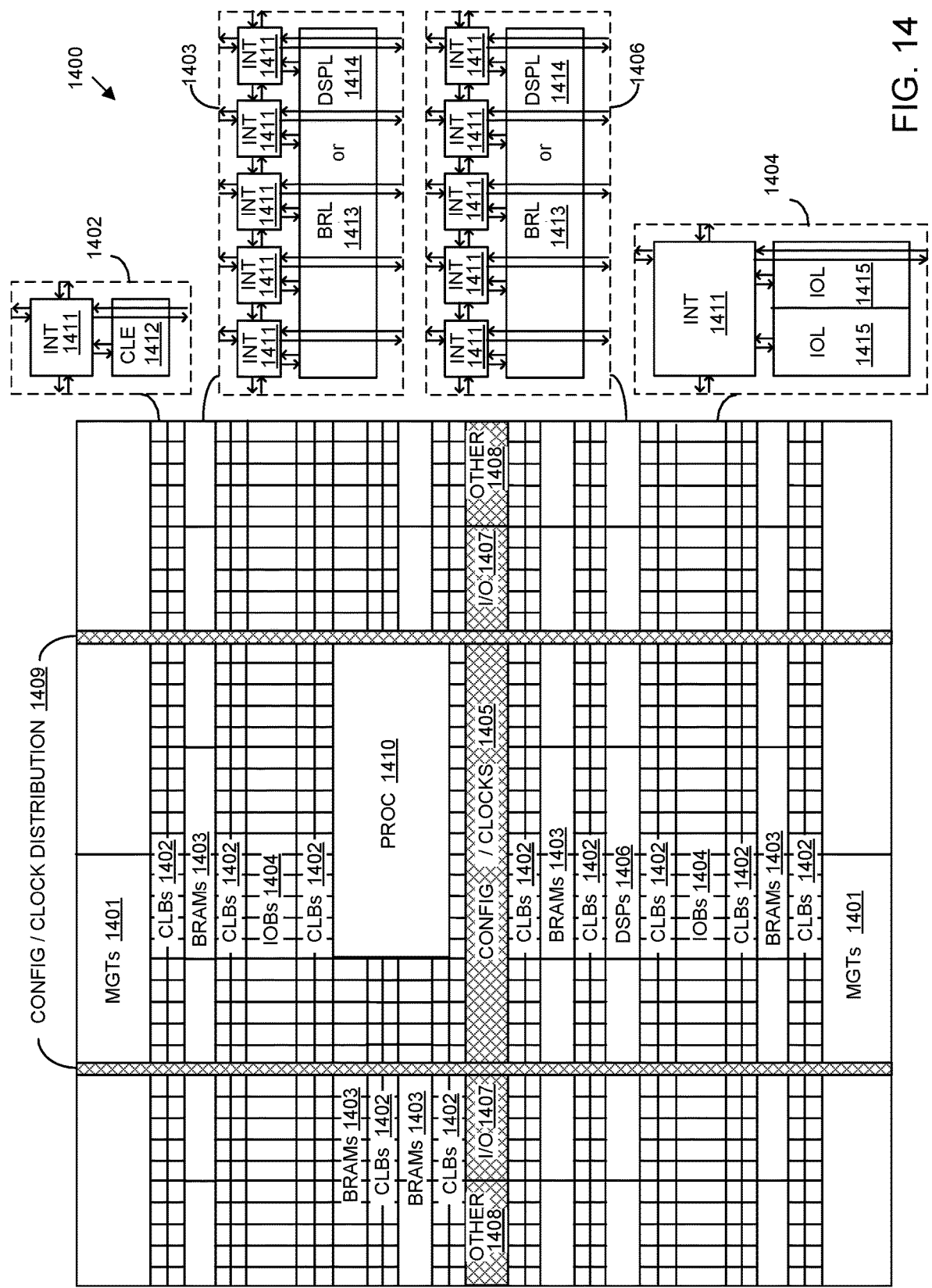
FIG. 14 illustrates an example architecture for an IC that is capable of implementing a runtime generator.

FIG. 14 illustrates an example architecture 1400 for an IC. In one aspect, architecture 1400 may be implemented within a programmable IC. For example, architecture 1400 may be used to implement an FPGA. Architecture 1400 may also be representative of a system-on-chip (SOC) type of IC. An SOC is an IC that includes a processor that executes program code and one or more other circuits. The other circuits may be implemented as hardwired circuitry, programmable circuitry, and/or a combination thereof. The circuits may operate cooperatively with one another and/or with the processor.

As shown, architecture 1400 includes several different types of programmable circuit, e.g., logic, blocks. For example, architecture 1400 may include a large number of different programmable tiles including multi-gigabit transceivers (MGTs) 1401, configurable logic blocks (CLBs) 1402, random access memory blocks (BRAMs) 1403, input/output blocks (IOBs) 1404, configuration and clocking logic (CONFIG/CLOCKS) 1405, digital signal processing blocks (DSPs) 1406, specialized I/O blocks 1407 (e.g., configuration ports and clock ports), and other programmable logic 1408 such as digital clock managers, ADCs, system monitoring logic, and so forth.

In some ICs, each programmable tile includes a programmable interconnect element (INT) 1411 having standardized connections to and from a corresponding INT 1411 in each adjacent tile. Therefore, INTs 1411, taken together, implement the programmable interconnect structure for the illustrated IC. Each INT 1411 also includes the connections to and from the programmable logic element within the same tile, as shown by the examples included at the top of FIG. 14.

For example, a CLB 1402 may include a configurable logic element (CLE) 1412 that may be programmed to implement user logic plus a single INT 1411. A BRAM 1403 may include a BRAM logic element (BRL) 1413 in addition to one or more INTs 1411. Typically, the number of INTs 1411 included in a tile depends on the height of the tile. As pictured, a BRAM tile has the same height as five CLBs, but other numbers (e.g., four) also may be used. A DSP tile 1406 may include a DSP logic element (DSPL) 1414 in addition to an appropriate number of INTs 1411. An IOB 1404 may include, for example, two instances of an I/O logic element (IOL) 1415 in addition to one instance of an INT 1411. The actual I/O pads connected to IOL 1415 may not be confined to the area of IOL 1415.

In the example pictured in FIG. 14, a columnar area near the center of the die, e.g., formed of regions 1405, 1407, and 1408, may be used for configuration, clock, and other control logic. Horizontal areas 1409 extending from this column may be used to distribute the clocks and configuration signals across the breadth of the programmable IC.

Some ICs utilizing the architecture illustrated in FIG. 14 include additional logic blocks that disrupt the regular columnar structure making up a large part of the IC. The additional logic blocks may be programmable blocks and/or dedicated circuitry. For example, a processor block depicted as PROC 1410 spans several columns of CLBs and BRAMs.

In one aspect, PROC 1410 may be implemented as dedicated circuitry, e.g., as a hardwired processor, that is fabricated as part of the die that implements the programmable circuitry of the IC. PROC 1410 may represent any of a variety of different processor types and/or systems ranging in complexity from an individual processor, e.g., a single core capable of executing program code, to an entire processor system having one or more cores, modules, co-processors, interfaces, or the like.

In another aspect, PROC 1410 may be omitted from architecture 1400 and replaced with one or more of the other varieties of the programmable blocks described. Further, such blocks may be utilized to form a "soft processor" in that the various blocks of programmable circuitry may be used to form a processor that can execute program code as is the case with PROC 1410.

The phrase "programmable circuitry" refers to programmable circuit elements within an IC, e.g., the various programmable or configurable circuit blocks or tiles described herein, as well as the interconnect circuitry that selectively couples the various circuit blocks, tiles, and/or elements according to configuration data that is loaded into the IC. For example, circuit blocks shown in FIG. 14 that are external to PROC 1410 such as CLBs 1402 and BRAMs 1403 are considered programmable circuitry of the IC.

In general, the functionality of programmable circuitry is not established until configuration data is loaded into the IC. A set of configuration bits may be used to program programmable circuitry of an IC such as an FPGA. The configuration bit(s) typically are referred to as a "configuration bitstream." In general, programmable circuitry is not operational or functional without first loading a configuration bitstream into the IC. The configuration bitstream effectively implements a particular circuit design within the programmable circuitry. The circuit design specifies, for example, functional aspects of the programmable circuit blocks and physical connectivity among the various programmable circuit blocks.

Circuitry that is "hardwired" or "hardened," i.e., not programmable, is manufactured as part of the IC. Unlike programmable circuitry, hardwired circuitry or circuit blocks are not implemented after the manufacture of the IC through the loading of a configuration bitstream. Hardwired circuitry is generally considered to have dedicated circuit blocks and interconnects, for example, that are functional without first loading a configuration bitstream into the IC, e.g., PROC 1410.

In the case of an SOC, the configuration bitstream may specify the circuitry that is to be implemented within the programmable circuitry and the program code that is to be executed by PROC 1410 or a soft processor. In some cases, architecture 1400 includes a dedicated configuration processor that loads the configuration bitstream to the appropriate configuration memory and/or processor memory. The dedicated configuration processor does not execute user-specified program code. In other cases, architecture 1400 may utilize PROC 1410 to receive the configuration bitstream, load the configuration bitstream into appropriate configuration memory, and/or extract program code for execution.

FIG. 14 is intended to illustrate an example architecture that may be used to implement an IC that includes programmable circuitry, e.g., a programmable fabric. For example, the number of logic blocks in a column, the relative width of the columns, the number and order of columns, the types of logic blocks included in the columns, the relative sizes of the logic blocks, and the interconnect/logic implementations included at the top of FIG. 14 are purely illustrative. In an actual IC, for example, more than one adjacent column of CLBs is typically included wherever the CLBs appear, to facilitate the efficient implementation of a user circuit design. The number of adjacent CLB columns, however, may vary with the overall size of the IC. Further, the size and/or positioning of blocks such as PROC 1410 within the IC are for purposes of illustration only and are not intended as limitations.

In one or more embodiments, a runtime generator as described herein may be implemented in an IC having an architecture as described in connection with FIG. 14. For example, processor 105 may be implemented as PROC 1410. In another example, processor 105 may be implemented as a soft-processor using the programmable circuit blocks described. The runtime generator may also be implemented using the programmable circuit blocks described. BRAMs 1403, for example, may be used to implement the next state circuit and/or the output circuit of runtime generator 140. LUTs that are configurable at runtime may be included in CLBs 1402 and may be used to implement the LUT circuit of a BFNG 400, a combinatorial circuit block, and/or comparators. Architecture 1400 may also include programmable circuit blocks such as shift registers that may be used to implement a runtime generator capable of implementing an LFSR.

In one or more embodiments, one or more different runtime generators may be deployed within a same IC. In an example, the runtime generators may operate parallel. In another example, the runtime generators may be serially connected. The runtime generators may be interconnected so that operation of one runtime generator is dependent upon operation of another runtime generator. In another aspect, however, the runtime generators may operate independently of one another. Further, the runtime generators may be heterogeneous, e.g., one or more different runtime generators each implementing an automaton circuit (e.g., a different automaton circuit).

In one or more other embodiments, a runtime generator may be implemented as executable program code that is executed by the processor of the IC. For example, a specification as described herein for an automaton circuit may be processed, e.g., compiled, to generate executable program code that may be provided to the processor in lieu of or in addition to parameterization data. Upon execution of the program code, the processor implements the automaton.

In one or more other embodiments, the processor is capable of implementing an automaton that may operate with one or more runtime generators as described herein. The automaton implemented by the processor (e.g., through execution of program code) may operate in coordination with the automaton circuit(s) implemented by the runtime generator(s) within the programmable circuitry. For example, the processor implemented automaton may be used in parallel with one or more runtime generators, in serial with one or more runtime generators (e.g., where the processor implemented automaton is interconnected with one or more runtime generators so that operation of one is dependent upon another), or used independently of runtime generator(s). Further, the processor implemented automaton may be the same or different than the automaton circuits implemented by the one or more runtime generators.

In still other embodiments, one or more portions of an automaton may be implemented by way of program code executed by a processor while one or more other portions (e.g., the remaining portions) of the automaton may be implemented by a runtime generator (or relevant portions thereof). The processor, in combination with the runtime generator may implement a hybrid automaton circuit. For example, a portion of an automaton such as the next state circuit, the output circuit, or the BFNG may be implemented via executable program code in the processor while the remaining portion(s) of the automaton are implemented in hardware as generally described herein.

Operation of any runtime generators may be controlled by way of the processor in real time. In response to events detected from the runtime generator(s), events detected from elsewhere within the IC, and/or events detected from external to the IC, the processor is capable of changing or modifying the particular automaton circuits that are implemented by the runtime generator(s) during runtime of the IC.

For purposes of explanation, specific nomenclature is set forth to provide a thorough understanding of the various inventive concepts disclosed herein. The terminology used herein, however, is for the purpose of describing particular aspects of the inventive arrangements only and is not intended to be limiting.

As defined herein, the singular forms "a," "an," and "the" are intended to include the plural forms as well, unless the context clearly indicates otherwise.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without user intervention. As defined herein, the term "user" means a human being.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. The various forms of memory, as described herein, are examples of computer readable storage media. A non-exhaustive list of more specific examples of a computer readable storage medium may include: a portable computer diskette, a hard disk, a RAM, a read-only memory (ROM), an erasable programmable read-only memory (EPROM or Flash memory), an electronically erasable programmable read-only memory (EEPROM), a static random access memory (SRAM), a portable compact disc read-only memory (CD-ROM), a digital versatile disk (DVD), a memory stick, a floppy disk, or the like.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the term "high-level programming language" (HLL) means a programming language, or set of instructions, used to program a data processing system where the instructions have a strong abstraction from the details of the data processing system, e.g., machine language. For example, a high level programming language may automate or hide aspects of operation of the data processing system such as memory management. Though referred to as "high-level programming languages," these languages are typically classified as "efficiency-level languages" or "ELLs." ELLs expose hardware-supported programming models directly. Examples of high-level programming languages include, but are not limited to, C, C++, and other suitable languages. A program written in an ELL is able to achieve multiple orders of magnitude higher performance than a high-productivity language particularly on emerging parallel hardware.

A high-productivity language (HPL) is a higher-level programming language than the aforementioned HLLs of the ELL variety. Characteristics of an HPL include, but are not limited to, being implemented as a scripting language. In another example, an HPL can be implemented as an extension language. Some HPLs are domain-specific, while others are not. HPLs provide abstractions that are suited or well-matched to the particular domain of that HPL. HPLs focus on programmer productivity as opposed to hardware efficiency. HPLs may provide utilities for debugging and visualization that are useful for domain experts, but lack support for taking advantage of lower level hardware functions such as parallel processing in systems. Examples of an HPL include, but are not limited to, Python, Scala, and R.

As defined herein, the term "responsive to" and similar language as described above, e.g., "if," "when," or "upon," means responding or reacting readily to an action or event. The response or reaction is performed automatically. Thus, if a second action is performed "responsive to" a first action, there is a causal relationship between an occurrence of the first action and an occurrence of the second action. The term "responsive to" indicates the causal relationship.

As defined herein, the terms "one embodiment," "an embodiment," "one or more embodiments," "particular embodiments," or similar language mean that a particular feature, structure, or characteristic described in connection with the embodiment is included in at least one embodiment described within this disclosure. Thus, appearances of the phrases "in one embodiment," "in an embodiment," "in one or more embodiments," "in particular embodiments," and similar language throughout this disclosure may, but do not necessarily, all refer to the same embodiment. The terms "embodiment" and "arrangement" are used interchangeably within this disclosure.

As defined herein, the term "processor" means at least one hardware circuit. The hardware circuit may be configured to carry out instructions contained in program code. The hardware circuit may be an integrated circuit. Examples of a processor include, but are not limited to, a central processing unit (CPU), an array processor, a vector processor, a digital signal processor (DSP), an FPGA, a programmable logic array (PLA), an ASIC, programmable logic circuitry, and a controller.

As defined herein, the term "real time" means a level of processing responsiveness that a user or system senses as sufficiently immediate for a particular process or determination to be made, or that enables the processor to keep up with some external process.

The terms first, second, etc. may be used herein to describe various elements. These elements should not be limited by these terms, as these terms are only used to distinguish one element from another unless stated otherwise or the context clearly indicates otherwise.

A computer program product may include a computer readable storage medium (or media) having computer readable program instructions thereon for causing a processor to carry out aspects of the inventive arrangements described herein. Within this disclosure, the term "program code" is used interchangeably with the term "computer readable program instructions." Computer readable program instructions described herein may be downloaded to respective computing/processing devices from a computer readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object-oriented programming language and/or procedural programming languages. Computer readable program instructions may include state-setting data. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer readable program instructions by utilizing state information of the computer readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer readable program instructions, e.g., program code.

These computer readable program instructions may be provided to a processor of a computer, whether a special purpose computer or other programmable data processing apparatus, to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowchart or block diagrams may represent a module, segment, or portion of instructions, which comprises one or more executable instructions for implementing the specified operations.

In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The corresponding structures, materials, acts, and equivalents of all means or step plus function elements that may be found in the claims below are intended to include any structure, material, or act for performing the function in combination with other claimed elements as specifically claimed.

In one or more embodiments, a system includes a runtime generator implemented in programmable circuitry of an IC. The runtime generator is parameterizable at runtime of the IC to perform at least one of detecting symbol patterns within data streams or generating pseudo random number binary sequences. The system may include a processor configured to execute program code, wherein the processor is configured to provide first parameterization data to the runtime generator at runtime of the IC. In response to receiving the first parameterization data, the runtime generator implements a first automaton circuit configured to detect a first symbol pattern or generate a first pseudo random number binary sequence.

In an aspect, the processor is configured to generate the first parameterization data from a specification.

In another aspect, the specification includes a regular expression.

In another aspect, the first automaton circuit includes a plurality of cells and the specification specifies rules for programming the plurality of cells.

In another aspect, the specification specifies a number of bits and taps of the first automaton circuit.

In another aspect, the processor is configured to provide second parameterization data to the runtime generator at runtime of the IC. The runtime generator is capable of implementing a second automaton circuit in response to receiving the second parameterization data from the processor. The second automaton circuit is configured to detect a second symbol pattern or generate a second pseudo random number binary sequence.

In another aspect, the runtime generator includes control circuitry programmable at runtime of the IC to pass a selected number of bits of an input signal and a selected number of bits of a state vector based upon the first parameterization data. The runtime generator may also include a next state circuit coupled to the control circuitry and programmable at runtime of the IC to determine next states of the first automaton circuit based upon the selected number of bits of the input signal and the selected number of bits of the state vector. The runtime generator may also include an output circuit coupled to the control circuitry and programmable at runtime of the IC to generate an output signal based upon the selected number of bits of the state vector.

In another aspect, the next state circuit and the output circuit may be implemented using a block random access memory.

In another aspect, the output circuit is programmable at runtime of the IC to generate the output signal based upon the selected number of bits of the state vector and the selected number of bits of the input signal.

In another aspect, the next state circuit is implemented using a block random access memory and the output circuit is implemented using a BFNG that is parameterizable at runtime of the IC to implement different Boolean function networks.

In another aspect, the runtime generator may include a data path circuit including a plurality of stateful circuit elements and a BFNG. An input and an output of each stateful circuit element may be coupled to the BFNG. The BFNG may couple the stateful circuit elements and applies Boolean functions to signals between selected ones of the plurality of stateful circuit elements.

In another aspect, the BFNG is parameterized to implement a linear machine.

In another aspect, the BFNG is parameterized to implement a nonlinear machine.

In another aspect, the runtime generator is parameterized to implement an LFSR.

In another aspect, the runtime generator is parameterized to implement a cellular automaton circuit.

In another aspect, the runtime generator may include a plurality comparators each programmable at runtime of the IC to detect a different symbol within the data stream and having an output coupled to the BFNG.

In another aspect, the data path circuit may include a plurality of input stages each programmable at runtime of the IC to detect a different symbol within the data stream and each including one of the plurality of stateful circuit elements. Each of the plurality of input stages may receive an enable signal from a node within the BFNG and provide an output signal indicating whether the symbol was detected to a node in the BFNG. The BFNG is programmable at runtime of the IC to route signals among the plurality of input stages and implement Boolean functions on selected ones of the output signals from the plurality of input stages to generate the enable signals.

In one or more embodiments, a method can include implementing a runtime generator within programmable circuitry of an IC and receiving, at the runtime generator, first parameterization data at runtime of the IC. The first parameterization data specifies a first automaton circuit. The method can include implementing the first automaton circuit within the runtime generator in response to the receiving the first parameterization data. The first automaton circuit is capable of performing at least one of detecting a first symbol pattern within a data stream or generating a first pseudo random number binary sequence.

In one aspect, the method may include implementing a second automaton circuit within the runtime generator in response to receiving second parameterization data at runtime of the IC, wherein the second parameterization data specifies the second automaton circuit. The second automaton circuit is capable of performing at least one of detecting a second symbol pattern within the data stream or generating second pseudo random numbers.

In another aspect, the method may include generating, using a processor, the first parameterization data from a specification.

The description of the inventive arrangements provided herein is for purposes of illustration and is not intended to be exhaustive or limited to the form and examples disclosed. The terminology used herein was chosen to explain the principles of the inventive arrangements, the practical application or technical improvement over technologies found in the marketplace, and/or to enable others of ordinary skill in the art to understand the inventive arrangements disclosed herein. Modifications and variations may be apparent to those of ordinary skill in the art without departing from the scope and spirit of the described inventive arrangements. Accordingly, reference should be made to the following claims, rather than to the foregoing disclosure, as indicating the scope of such features and implementations.

What is claimed is:

1. A system, comprising:
a runtime generator implemented in programmable circuitry of an integrated circuit, wherein the runtime generator is parameterizable at runtime of the integrated circuit to perform at least one of detecting symbol patterns within a data stream or generating pseudo random number binary sequences; and
a processor configured to execute program code, wherein the processor is configured to provide first parameterization data to the runtime generator at runtime of the integrated circuit;
wherein, in response to receiving the first parameterization data, the runtime generator implements a first automaton circuit configured to detect a first symbol pattern or generate a first pseudo random number binary sequence.

2. The system of claim 1, wherein the processor is configured to generate the first parameterization data from a specification.

3. The system of claim 2, wherein the specification includes a regular expression.

4. The system of claim 2, wherein the first automaton circuit includes a plurality of cells and the specification specifies rules for programming the plurality of cells.

5. The system of claim 2, wherein the specification specifies a number of bits and taps of the first automaton circuit.

6. The system of claim 1, wherein:
the processor is configured to provide second parameterization data to the runtime generator at runtime of the integrated circuit; and
the runtime generator implements a second automaton circuit in response to receiving the second parameterization data from the processor, wherein the second automaton circuit is configured to detect a second symbol pattern or generate a second pseudo random number binary sequence.

7. The system of claim 1, wherein the runtime generator comprises:
control circuitry programmable at runtime of the integrated circuit to pass a selected number of bits of an input signal and a selected number of bits of a state vector based upon the first parameterization data;
a next state circuit coupled to the control circuitry and programmable at runtime of the integrated circuit to determine next states of the first automaton circuit based upon the selected number of bits of the input signal and the selected number of bits of the state vector; and
an output circuit coupled to the control circuitry and programmable at runtime of the integrated circuit to generate an output signal based upon the selected number of bits of the state vector.

8. The system of claim 7, wherein the next state circuit and the output circuit are implemented using a block random access memory.

9. The system of claim 7, wherein the output circuit is programmable at runtime of the integrated circuit to generate the output signal based upon the selected number of bits of the state vector and the selected number of bits of the input signal.

10. The system of claim 9, wherein the next state circuit is implemented using a block random access memory and the output circuit is implemented using a Boolean function network generator that is parameterizable at runtime of the integrated circuit to implement different Boolean function networks.

11. The system of claim 1, wherein the runtime generator comprises:
a data path circuit including a plurality of stateful circuit elements; and
a Boolean function network generator, wherein an input and an output of each stateful circuit element is coupled to the Boolean function network generator, wherein the Boolean function network generator couples the stateful circuit elements and applies Boolean functions to signals between selected ones of the plurality of stateful circuit elements.

12. The system of claim 11, wherein the Boolean function network generator is parameterized to implement a linear machine.

13. The system of claim 11, wherein the Boolean function network generator is parameterized to implement a nonlinear machine.

14. The system of claim 11, wherein the runtime generator is parameterized to implement a linear feedback shift register.

15. The system of claim 11, wherein the runtime generator is parameterized to implement a cellular automaton circuit.

16. The system of claim 11, wherein the runtime generator further comprises:
a plurality comparators each programmable at runtime of the integrated circuit to detect a different symbol within the data stream and having an output coupled to the Boolean function network generator.

17. The system of claim 11, wherein the data path circuit further comprises:
a plurality of input stages each programmable at runtime of the integrated circuit to detect a different symbol within the data stream and each including one of the plurality of stateful circuit elements; and
wherein each of the plurality of input stages receives an enable signal from a node within the Boolean function network generator and provides an output signal indicating whether the symbol was detected to a node in the Boolean function network generator; and
wherein the Boolean function network generator is programmable at runtime of the integrated circuit to route signals among the plurality of input stages and implement Boolean functions on selected ones of the output signals from the plurality of input stages to generate the enable signals.

18. A method, comprising:
implementing a runtime generator within programmable circuitry of an integrated circuit;
receiving, at the runtime generator, first parameterization data at runtime of the integrated circuit, wherein the first parameterization data specifies a first automaton circuit; and
implementing the first automaton circuit within the runtime generator in response to the receiving the first parameterization data, wherein the first automaton circuit is capable of performing at least one of detecting a first symbol pattern within a data stream or generating first pseudo random numbers.

19. The method of claim 18, further comprising:
implementing a second automaton circuit within the runtime generator in response to receiving second parameterization data at runtime of the integrated circuit, wherein the second parameterization data specifies the second automaton circuit;
wherein the second automaton circuit is capable of performing at least one of detecting a second symbol pattern within the data stream or generating second pseudo random numbers.

20. The method of claim 18, further comprising:
generating, using a processor, the first parameterization data from a specification.

* * * * *